US012128682B2

(12) United States Patent
Matsumoto et al.

(10) Patent No.: US 12,128,682 B2
(45) Date of Patent: Oct. 29, 2024

(54) LIQUID EJECTING APPARATUS

(71) Applicant: Seiko Epson Corporation, Tokyo (JP)

(72) Inventors: Yusuke Matsumoto, Shiojiri (JP); Toru Matsuyama, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 123 days.

(21) Appl. No.: 17/512,828

(22) Filed: Oct. 28, 2021

(65) Prior Publication Data

US 2022/0134742 A1 May 5, 2022

(30) Foreign Application Priority Data

Oct. 29, 2020 (JP) ................................ 2020-181650

(51) Int. Cl.
*B41J 2/045* (2006.01)
*H01R 12/52* (2011.01)
*B41J 2/14* (2006.01)

(52) U.S. Cl.
CPC ....... *B41J 2/04588* (2013.01); *B41J 2/04541* (2013.01); *B41J 2/04581* (2013.01); *H01R 12/52* (2013.01); *B41J 2002/14491* (2013.01)

(58) Field of Classification Search
CPC ............................................. B41J 2002/14491
See application file for complete search history.

(56) References Cited

U.S. PATENT DOCUMENTS 4,583,807 A 4/1986 Kaufman et al.
10,576,740 B2 * 3/2020 Yamada .............. B41J 2/14233
10,661,559 B2 5/2020 Uematsu et al.
2004/0147630 A1 * 7/2004 Schmid .............. C09B 67/0073 523/160
2005/0157004 A1 7/2005 Silverbrook et al.
(Continued)

FOREIGN PATENT DOCUMENTS

CN 107867067 A 4/2018
JP S60-140688 A 7/1985
(Continued)

OTHER PUBLICATIONS

U.S. Appl. No. 17/512,778, filed Oct. 8, 2021, Yusuke Matsumoto Toru Matsuyama.
(Continued)

*Primary Examiner* — Shelby L Fidler
(74) *Attorney, Agent, or Firm* — Harness, Dickey & Pierce, P.L.C.

(57) ABSTRACT

A liquid ejecting apparatus includes a head unit, and a drive signal output unit that outputs a drive signal. The head unit includes a first rigid substrate, and a first connector to which the drive signal is input, the drive signal output unit includes a second rigid substrate, and a second connector from which the drive signal is output, the first connector includes a first fixing portion, and a first terminal, the second connector includes a second fixing portion, and a second terminal, one of the first connector and the second connector has a receptacle shape, the other has a plug shape, the first connector and the second connector are fitted so that the first terminal and the second terminal are in direct contact with each other, and at least one of the first fixing portion and the second fixing portion is tin-plated.

8 Claims, 19 Drawing Sheets

(56) References Cited

U.S. PATENT DOCUMENTS

| | | | | |
|---|---|---|---|---|
| 2005/0179729 | A1* | 8/2005 | Keenan | B41J 2/1623 347/50 |
| 2006/0276061 | A1 | 12/2006 | Koguchi et al. | |
| 2007/0202729 | A1* | 8/2007 | Uesaka | H01R 12/57 439/248 |
| 2009/0278896 | A1 | 11/2009 | Akahane | |
| 2010/0304584 | A1* | 12/2010 | Miyazaki | H01R 24/84 439/78 |
| 2015/0083478 | A1* | 3/2015 | Endo | H05K 1/181 29/874 |
| 2015/0140841 | A1 | 5/2015 | Watanabe | |
| 2017/0033480 | A1 | 2/2017 | Sato | |
| 2017/0217169 | A1* | 8/2017 | Kanegae | B41J 2/1433 |
| 2017/0217176 | A1* | 8/2017 | Sato | B41J 2/04581 |
| 2017/0217198 | A1 | 8/2017 | Sato et al. | |
| 2018/0086053 | A1 | 3/2018 | Uematsu et al. | |
| 2018/0086054 | A1* | 3/2018 | Abe | B41J 2/04541 |
| 2018/0170038 | A1 | 6/2018 | Matsumoto | |
| 2018/0345658 | A1* | 12/2018 | Shimono | B41J 2/0459 |
| 2018/0346641 | A1* | 12/2018 | Hegi | C08L 67/00 |
| 2019/0047281 | A1 | 2/2019 | van Brocklin et al. | |
| 2019/0081439 | A1* | 3/2019 | Schneider | H01R 12/585 |
| 2019/0232646 | A1 | 8/2019 | Ito et al. | |
| 2019/0296492 | A1 | 9/2019 | Kakino et al. | |
| 2019/0358951 | A1 | 11/2019 | Uematsu et al. | |
| 2020/0198330 | A1* | 6/2020 | Uematsu | B41J 2/04596 |
| 2020/0307254 | A1 | 10/2020 | Ohashi | |
| 2021/0167532 | A1* | 6/2021 | Ashibu | H01R 13/631 |

FOREIGN PATENT DOCUMENTS

| | | | | | |
|---|---|---|---|---|---|
| JP | H10-134907 | A | | 5/1998 | |
| JP | 2001085088 | A | * | 3/2001 | H01R 12/7023 |
| JP | 2003273487 | A | | 9/2003 | |
| JP | 2015099694 | A | | 5/2015 | |
| JP | 2018-051772 | A | | 4/2018 | |
| JP | 2019-130821 | A | | 8/2019 | |
| JP | 2019169370 | A | | 10/2019 | |
| JP | 2020157709 | A | | 10/2020 | |
| WO | 2020/044561 | A1 | | 3/2020 | |

OTHER PUBLICATIONS

U.S. Appl. No. 17/512,947, filed Oct. 28, 2021, Yusuke Matsumoto Toru Matsuyama.

* cited by examiner

| [SIH, SIL] | | [1, 1] (LD) | [1, 0] (MD) | [0, 1] (SD) | [0, 0] (ND) |
|---|---|---|---|---|---|
| S1 | T1 | H | H | H | L |
| | T2 | H | L | L | L |
| S2 | T1 | L | L | L | H |
| | T2 | L | H | L | L |

LIQUID EJECTING APPARATUS

The present application is based on, and claims priority from JP Application Serial Number 2020-181650, filed Oct. 29, 2020, the disclosure of which is hereby incorporated by reference herein in its entirety.

BACKGROUND

1. Technical Field

The present disclosure relates to a liquid ejecting apparatus.

2. Related Art

Liquid ejecting apparatuses such as an ink jet printer eject a liquid such as ink filled in a cavity from a nozzle by driving a piezoelectric element serving as a drive element provided in a print head included in a head unit using a drive signal, and form characters and images on a medium. Since the piezoelectric element is a capacitive load like a capacitor when viewed electrically, it is necessary to supply a sufficient current in order to operate the piezoelectric element of each nozzle. Therefore, in the above-mentioned ink jet printer, a drive circuit supplies a high-voltage drive signal amplified by an amplifier circuit to a head to drive a piezoelectric element.

For example, JP-A-2018-051772 discloses an ink jet printer that drives a piezoelectric element and ejects a liquid from a nozzle by supplying a drive signal output by a drive signal generation circuit to the piezoelectric element included in an ejection module. Further, JP-A-2019-130821 discloses an ink jet printer that drives a piezoelectric element and ejects a liquid from a nozzle by supplying a drive signal output by a drive circuit to the piezoelectric element included in a head module.

In liquid ejecting apparatuses as described in JP-A-2018-051772 and JP-A-2019-130821 in recent years, a wide variety of inks are used with the diversification of their uses. Therefore, the physical properties of the ink used in the liquid ejecting apparatus are also diverse, and each configuration of the liquid ejecting apparatus is required to have high corrosion resistance in order to reduce the possibility of corrosion caused by the adhesion of the ejected ink. In particular, when a connector that supplies a drive signal to a head unit is corroded due to ink by electrically coupling a drive signal output circuit and the head unit, the drive signal cannot be supplied to the head unit, as a result, ink may not be ejected from the liquid ejecting apparatus. However, the disclosures described in JP-A-2018-051772 and JP-A-2019-130821 do not have sufficient countermeasures against problems that occur in the connector due to the physical properties of the ink used in such a liquid ejecting apparatus, and there is room for improvement.

SUMMARY

According to an aspect of the present disclosure, there is provided a liquid ejecting apparatus including a head unit that includes a piezoelectric element that is driven with supply of a drive signal and ejects a liquid by driving the piezoelectric element, and a drive signal output unit that outputs the drive signal, in which the head unit includes an ejection portion that ejects the liquid, a first rigid substrate that propagates the drive signal to the ejection portion, and a first connector to which the drive signal is input, the drive signal output unit includes a second rigid substrate and a second connector from which the drive signal is output, the first connector includes a first fixing portion fixed to the first rigid substrate and a first terminal through which the drive signal propagates, the second connector includes a second fixing portion fixed to the second rigid substrate and a second terminal through which the drive signal propagates, one of the first connector and the second connector has a receptacle shape, the other of the first connector and the second connector has a plug shape, the first connector and the second connector are fitted so that the first terminal and the second terminal are in direct contact with each other, and at least one of the first fixing portion and the second fixing portion is tin-plated.

DESCRIPTION OF EXEMPLARY EMBODIMENTS

Hereinafter, preferred embodiments of the present disclosure will be described with reference to the drawings. The drawings used are for convenience of description. The embodiments to be described below do not unduly limit the contents of the present disclosure described in the scope of claims. In addition, all of the configurations to be described below are not necessarily essential configuration requirements of the present disclosure.

1. Functional Configuration of Liquid Ejecting Apparatus

First, the functional configuration of a liquid ejecting apparatus 1 according to the present embodiment will be described with reference to FIG. 1. The liquid ejecting apparatus 1 according to the present embodiment will be described by taking, as an example, an ink jet printer that forms a desired image on a medium by ejecting ink as an example of a liquid onto the medium. Such a liquid ejecting apparatus 1 receives image data propagated by wired communication or wireless communication from an external device such as a computer provided externally, and forms a desired image on a medium by ejecting ink to the medium at a timing based on the received image data.

Figure 1A:
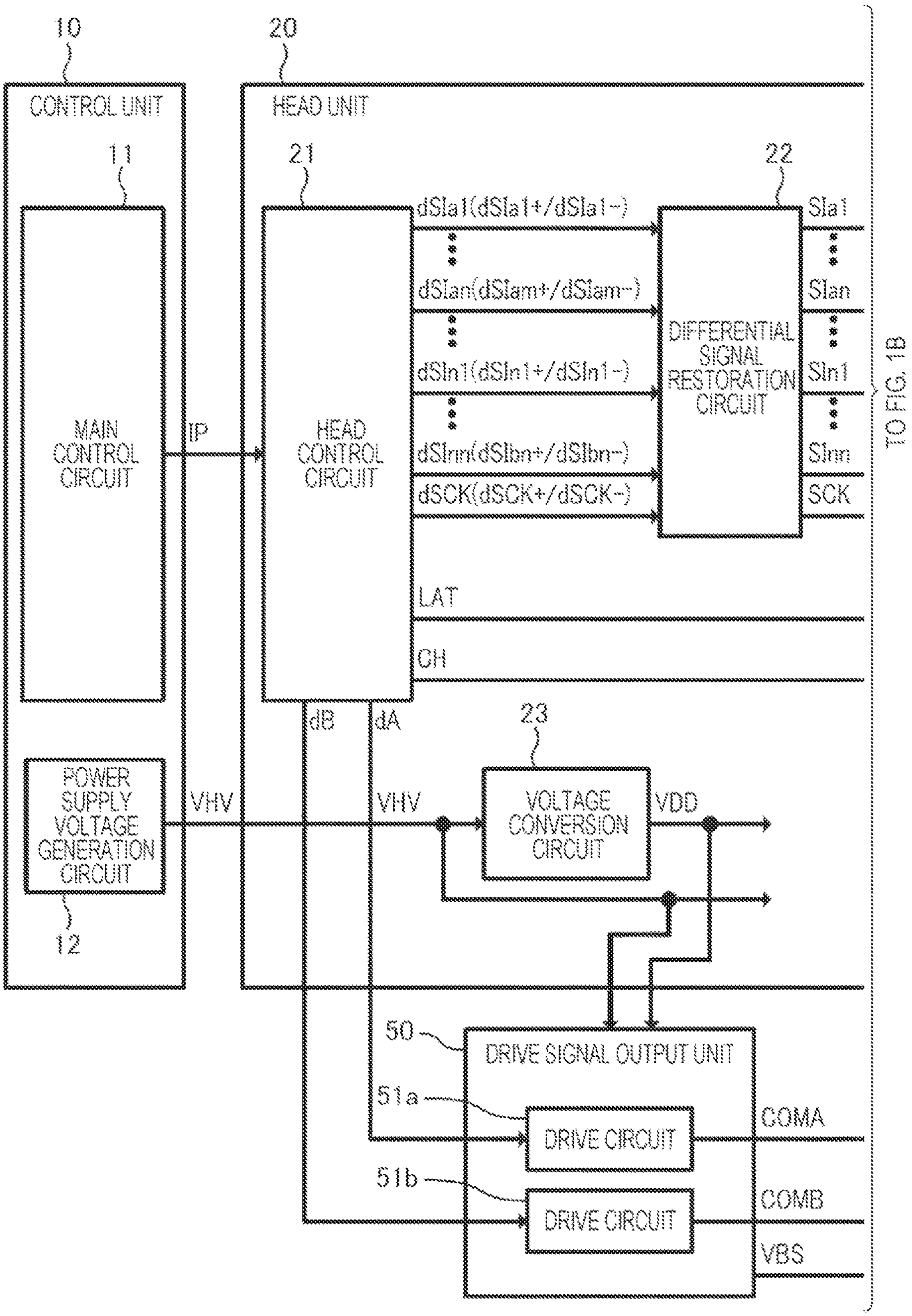
FIGS. 1A and 1B are diagrams showing a functional configuration of a liquid ejecting apparatus.
Figure 1B:
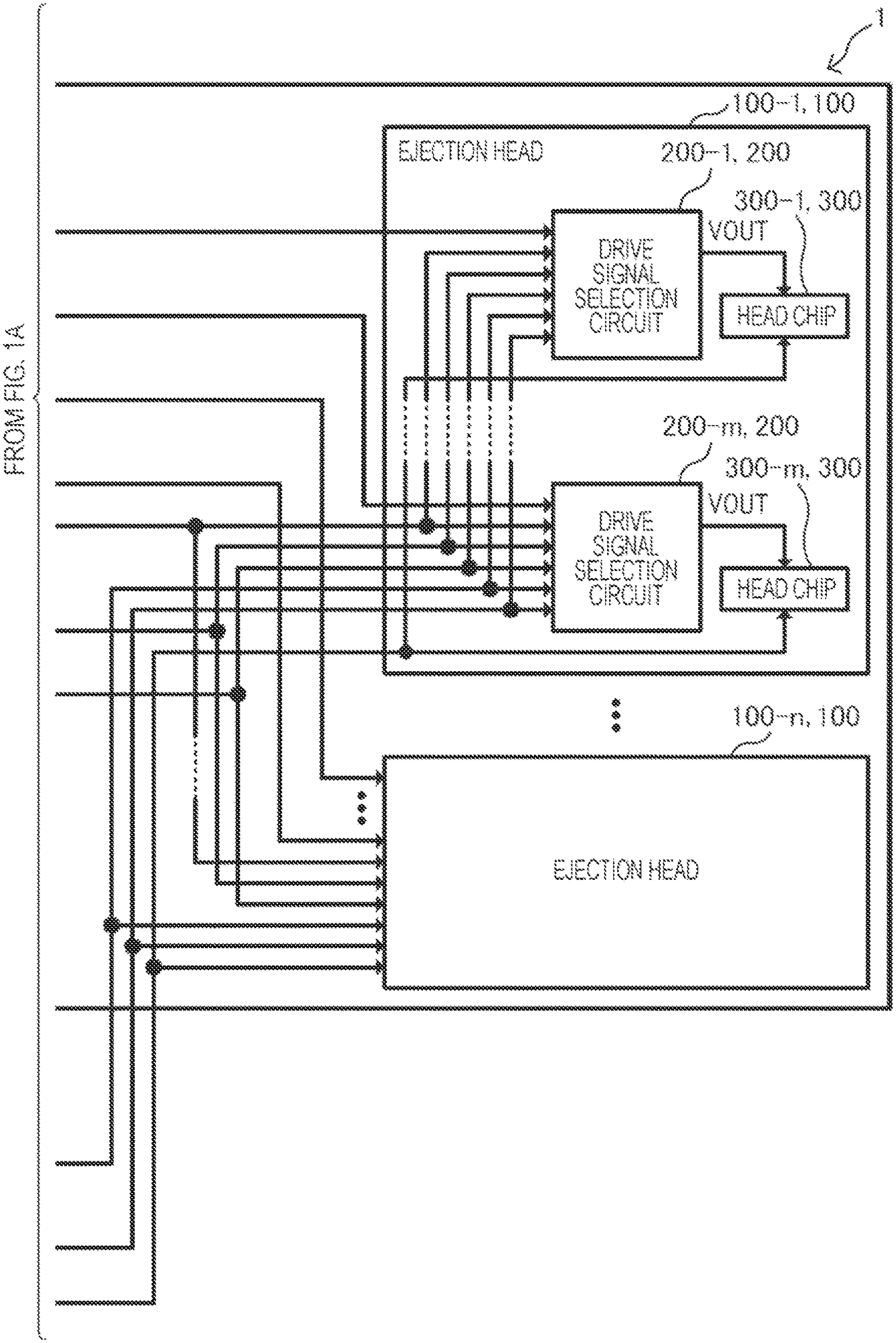

FIGS. 1A and 1B are diagrams showing a functional configuration of the liquid ejecting apparatus 1. As shown in FIGS. 1A and 1B, the liquid ejecting apparatus 1 includes a control unit 10, a head unit 20, and a drive signal output unit 50.

The control unit 10 generates and outputs various signals for controlling the head unit 20 and the drive signal output unit 50 based on image data supplied from an external device (not shown). The control unit 10 has a main control circuit 11 and a power supply voltage generation circuit 12. A commercial voltage, which is an AC voltage, is input to the power supply voltage generation circuit 12 from a commercial AC power supply (not shown) provided outside the liquid ejecting apparatus 1. The power supply voltage generation circuit 12 generates, for example, a voltage VHV which is a DC voltage having a voltage value of 42 V based on the input commercial voltage, and outputs the voltage to the head unit 20. Such a power supply voltage generation circuit 12 is an AC/DC converter that converts an AC voltage into a DC voltage, and includes, for example, a flyback circuit and the like, and a DC/DC converter and the like that convert the voltage value of the DC voltage output by the flyback circuit. The voltage VHV generated by the power supply voltage generation circuit 12 is supplied to the head unit 20 and used as power supply voltages having various configurations of the head unit 20, and is also supplied to the drive signal output unit 50 via the head unit 20. In addition to the voltage VHV, the power supply voltage generation circuit 12 may generate voltage signals of voltage values used in each portion of the liquid ejecting apparatus 1 including the control unit 10, the head unit 20, and the drive signal output unit 50, and output the voltage signals to each corresponding configuration.

Image data is input to the main control circuit 11 from an external device such as a host computer provided outside the liquid ejecting apparatus 1 via an interface circuit (not shown). The main control circuit 11 generates various signals for forming an image on the medium according to the input image data, and outputs the signals to the corresponding configurations.

Specifically, the main control circuit 11 performs predetermined image processing on image data input from an external device, and then outputs the image-processed signal to the head unit 20 as an image information signal IP. The image information signal IP output from the main control circuit 11 is an electric signal such as a differential signal, and is output as, for example, a high-speed communication signal based on a peripheral component interconnect express (PCIe) communication standard. In addition, examples of the image processing executed by the main control circuit 11 include color conversion processing for converting the image signal input from the external device into color information of red, green, and blue and then converting the converted color information into color information corresponding to the color of the ink ejected from the liquid ejecting apparatus 1, and halftone processing for binarizing color information that has undergone the color conversion processing. The image processing executed by the main control circuit 11 is not limited to the color conversion processing and the halftone processing described above.

As described above, the main control circuit 11 generates the image information signal IP that controls the operation of the head unit 20 and outputs the signals to the head unit 20. Such a main control circuit 11 includes, for example, a system on a chip (SoC) including one or a plurality of semiconductor devices having a plurality of functions.

The head unit 20 includes a head control circuit 21, a differential signal restoration circuit 22, a voltage conversion circuit 23, and ejection heads 100-1 to **100-*n***.

The voltage VHV is input to the voltage conversion circuit 23. Then, the voltage conversion circuit 23 generates and outputs a voltage VDD, which is a predetermined voltage value of the input voltage VHV and is, for example, a DC voltage of 5 V. Such a voltage conversion circuit 23 includes, for example, a DC/DC converter and the like. Then, the voltage VDD generated by the voltage conversion circuit 23 is supplied to each portion of the head unit 20 and also to the drive signal output unit 50.

The head control circuit 21 outputs a control signal for controlling each portion of the head unit 20 based on the image information signal IP input from the main control circuit 11. Specifically, the head control circuit 21 generates a differential signal dSCK obtained by converting a control signal for controlling the ejection of ink from each of the ejection heads 100-1 to **100-*n* into a differential signal and differential signals dSIa1 to dSIam, . . . , dSIn1 to dSInm corresponding to the ejection heads 100-1 to 100-*n*, respectively, based on the image information signal IP, and outputs the signals to the differential signal restoration circuit 22**.

The differential signal restoration circuit 22 restores each of the input differential signal dSCK and differential signals dSIa1 to dSIam, . . . , dSIn1 to dSInm into the clock signal SCK, and the corresponding print data signals SIa1 to SIam, . . . , SIn1 to SInm, and outputs the signals to the corresponding ejection heads 100-1 to **100-*n***.

Specifically, the head control circuit 21 generates a differential signal dSCK including a pair of signals dSCK+ and dSCK−, and outputs the differential signal to the differential signal restoration circuit 22. The differential signal restoration circuit 22 generates a clock signal SCK, which is a single-ended signal, by restoring the input differential signal dSCK, and outputs the clock signal to the ejection heads 100-1 to **100-*n***.

The head control circuit 21 generates differential signals dSIa1 to dSIam including a pair of signals dSIa1+ to dSIam+ and dSIa1− to dSIam−, and outputs the differential signals to the differential signal restoration circuit 22. The differential signal restoration circuit 22 generates print data signals SIa1 to SIam, which are single-ended signals, by restoring the input differential signals dSIa1 to dSIam, and outputs the print data signals to the ejection head 100-1.

The head control circuit 21 generates differential signals dSIn1 to dSInm including a pair of signals dSIn1+ to dSInm+ and dSIn1− to dSInm−, and outputs the differential signals to the differential signal restoration circuit 22. The differential signal restoration circuit 22 generates print data signals SIn1 to SInm, which are single-ended signals, by restoring the input differential signals dSIn1 to dSInm, and outputs the print data signals to the ejection head 100-*n*.

That is, the head control circuit 21 generates a differential signal dSCK, which is the basis of the clock signal SCK commonly input to the ejection heads 100-1 to 100-*n*, and differential signals dSI11 to dSI1*m*, . . . , dSIn1 to dSInm which are the basis of the print data signals SI11 to SI1*m*, . . . , SIn1 to SInm individually input to the ejection heads 100-1 to 100-*n*, and outputs the differential signals to the differential signal restoration circuit 22. The differential signal restoration circuit 22 restores the differential signal dSCK and the differential signals dSI11 to dSI1*m*, . . . , dSIn1 to dSInm to generate the clock signal SCK and the print data signals SI11 to SI1*m*, . . . , SIn1 to SInm, which are single-ended signals, and outputs the signals to the corresponding ejection heads 100-1 to 100-*n*.

Here, each of the differential signal dSCK and the differential signals dSIa1 to dSIam, . . . , dSIn1 to dSInm output from the head control circuit 21 may be a differential signal of a low voltage differential signaling (LVDS) transfer method, or a differential signal of various high-speed communication methods such as low voltage positive emitter coupled logic (LVPECL) or current mode logic (CML) other than LVDS.

Further, the head control circuit 21 generates a latch signal LAT and a change signal CH as control signals for controlling the ink ejection timing from the ejection heads 100-1 to 100-*n* based on the image information signal IP input from the main control circuit 11, and outputs the signals to the ejection heads 100-1 to 100-*n*.

Further, the head control circuit 21 generates basic drive data dA and dB which are the basis of drive signals COMA and COMB for driving the ejection heads 100-1 to 100-*n* based on the image information signal IP input from the main control circuit 11, and outputs the data to the drive signal output unit 50.

The drive signal output unit 50 includes drive circuits 51*a* and 51*b*. The basic drive data dA is input to the drive circuit 51*a*. The drive circuit 51*a* generates a drive signal COMA by converting the input basic drive data dA into an analog signal and then amplifying the converted analog signal in class D based on the voltage VHV, and outputs the drive signal to the ejection heads 100-1 to 100-*n* included in the head unit 20. The basic drive data dB is input to the drive circuit 51*b*. The drive circuit 51*b* generates a drive signal COMB by converting the input basic drive data dB into an analog signal and then amplifying the converted analog signal in class D based on the voltage VHV, and outputs the drive signal to the ejection heads 100-1 to 100-*n*. Further, the drive signal output unit 50 generates a reference voltage signal VBS which is a reference potential when ink is ejected from the ejection heads 100-1 to 100-*n* by boosting or stepping down the voltage VDD, and outputs the reference voltage signal to the ejection heads 100-1 to 100-*n*. That is, the drive signal output unit 50 includes two class D amplifier circuits that generate drive signals COMA and COMB, and a step-down circuit or booster circuit that generates a reference voltage signal VBS.

Here, in the present embodiment, the description has been made that the drive circuit 51*a* generates the drive signal COMA and outputs the drive signal COMA to the ejection heads 100-1 to 100-*n*, the drive circuit 51*b* generates the drive signal COMB and outputs drive signal COMB to the ejection heads 100-1 to 100-*n*. However, the present disclosure is not limited thereto. For example, the drive signal output unit 50 may include n drive circuits 51*a* that output drive signal COMA corresponding to each of the ejection heads 100-1 to 100-*n*, and n drive circuits 51*b* that output drive signal COMB corresponding to each of the ejection heads 100-1 to 100-*n*. The drive circuits 51*a* and 51*b* need only be able to amplify the analog signals corresponding to the input basic drive data dA and dB based on the voltage VHV, and may include a class A amplifier circuit, a class B amplifier circuit, or a class AB amplifier circuit.

The ejection head 100-1 included in the head unit 20 has drive signal selection circuits 200-1 to 200-*m* and head chips 300-1 to 300-*m* corresponding to the drive signal selection circuits 200-1 to 200-*m*, respectively.

The print data signal SIa1, the clock signal SCK, the latch signal LAT, the change signal CH, and the drive signals COMA and COMB are input to the drive signal selection circuit 200-1 included in the ejection head 100-1. The drive signal selection circuit 200-1 included in the ejection head 100-1 generates a drive signal VOUT by selecting or not selecting the waveform included in the drive signals COMA and COMB at the timing defined by the latch signal LAT and the change signal CH based on the print data signal SIa1, and supplies the drive signal to the head chip 300-1 included in the ejection head 100-1. Thereby, a piezoelectric element 60, which will be described later, of the head chip 300-1 is driven, and ink is ejected from the corresponding nozzles as the piezoelectric element 60 is driven.

Similarly, the print data signal SIam, the clock signal SCK, the latch signal LAT, the change signal CH, and the drive signals COMA and COMB are input to the drive signal selection circuit 200-*m* included in the ejection head 100-1. The drive signal selection circuit 200-*m* included in the ejection head 100-1 generates a drive signal VOUT by selecting or not selecting the waveform included in the drive signals COMA and COMB at the timing defined by the latch signal LAT and the change signal CH based on the print data signal SIam, and supplies the drive signal to the head chip 300-*m* included in the ejection head 100-1. Thereby, a piezoelectric element 60, which will be described later, of the head chip 300-*m* is driven, and ink is ejected from the corresponding nozzles as the piezoelectric element 60 is driven.

That is, each of the drive signal selection circuits 200-1 to 200-*m* switches whether or not to supply the drive signals COMA and COMB as the drive signals VOUT to the piezoelectric elements 60 included in the corresponding head chips 300-1 to 300-*m*.

Here, the ejection head 100-1 and the ejection heads 100-2 to 100-*n* differ only in the input signal, and the configuration and operation are the same. Therefore, the description of the detailed configuration and operation of the ejection heads 100-1 to 100-*n* will be omitted. Further, in the following description, when it is not necessary to particularly distinguish the ejection heads 100-1 to 100-*n*, they may be simply referred to as the ejection head 100. Further, the drive signal selection circuits 200-1 to 200-*m* included in the ejection head 100 all have the same configuration, and the head chips 300-1 to 300-*m* all have the same configuration. Therefore, when it is not necessary to distinguish the drive signal selection circuits 200-1 to 200-*m*, they are simply referred to as the drive signal selection circuit 200, and the description has been made that the drive signal selection circuit 200 supplies the drive signal VOUT to the head chip 300. Then, the description has been made that the print data signal SI, the clock signal SCK, the latch signal LAT, the change signal CH, and the drive signals COMA and COMB are input to the drive signal selection circuit 200.

2. Configuration and Operation of Drive Signal Selection Circuit

Next, the configuration and operation of the drive signal selection circuit 200 will be described. As described above, the drive signal selection circuit 200 generates a drive signal VOUT by selecting or not selecting the waveforms of the input drive signals COMA and COMB, and outputs the drive signal to the corresponding head chip 300. Therefore, in describing the configuration and operation of the drive signal selection circuit 200, first, an example of waveforms of the drive signals COMA and COMB input to the drive signal selection circuit 200 and an example of a waveform of the drive signal VOUT output by the drive signal selection circuit 200 will be described.

Figure 2:
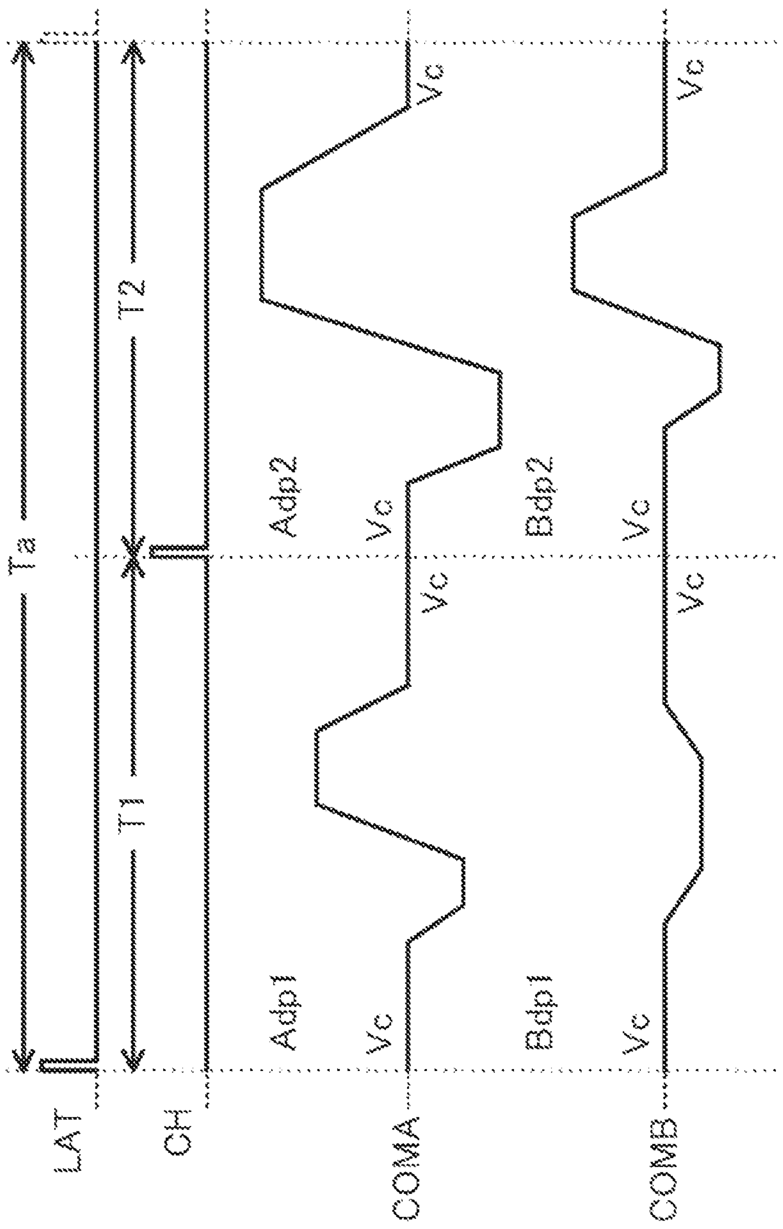
FIG. 2 is a diagram showing an example of waveforms of drive signals.

FIG. 2 is a diagram showing an example of waveforms of drive signals COMA and COMB. As shown in FIG. 2, the drive signal COMA is a waveform in which a trapezoidal waveform Adp1 arranged in a period T1 from the rise of the latch signal LAT to the rise of the change signal CH and a trapezoidal waveform Adp2 arranged in a period T2 from the rise of the change signal CH to the rise of the latch signal LAT are continuous. When the trapezoidal waveform Adp1 is supplied to the head chip 300, a small amount of ink is ejected from the corresponding nozzle of the head chip 300, and when the trapezoidal waveform Adp2 is supplied to the head chip 300, a medium amount of ink, more than a small amount, is ejected from the corresponding nozzle of the head chip 300.

Further, as shown in FIG. 2, the drive signal COMB is a waveform in which a trapezoidal waveform Bdp1 arranged in the period T1 and a trapezoidal waveform Bdp2 arranged in the period T2 are continuous. When the trapezoidal waveform Bdp1 is supplied to the head chip 300, ink is not ejected from the corresponding nozzle of the head chip 300. The trapezoidal waveform Bdp1 is a waveform for slightly vibrating the ink near the opening of the nozzle to prevent an increase in ink viscosity. Further, when the trapezoidal waveform Bdp2 is supplied to the head chip 300, a small amount of ink is ejected from the corresponding nozzle of the head chip 300, as in the case where the trapezoidal waveform Adp1 is supplied.

Here, as shown in FIG. 2, the voltage values at the start timing and end timing of each of the trapezoidal waveforms Adp1, Adp2, Bdp1, and Bdp2 are all common to a voltage Vc. That is, each of the trapezoidal waveforms Adp1, Adp2, Bdp1, and Bdp2 is a waveform that starts at a voltage Vc and ends at a voltage Vc. A cycle Ta including the period T1 and the period T2 corresponds to a printing cycle for forming new dots on the medium.

In FIG. 2, although the trapezoidal waveform Adp1 and the trapezoidal waveform Bdp2 are shown as having the same waveform, the trapezoidal waveform Adp1 and the trapezoidal waveform Bdp2 may have different waveforms. Further, the description has been made that a small amount of ink is ejected from the corresponding nozzles in both the case where the trapezoidal waveform Adp1 is supplied to the head chip 300 and the case where the trapezoidal waveform Bdp1 is supplied to the head chip 300. However, the present disclosure is not limited thereto. That is, the waveforms of the drive signals COMA and COMB are not limited to the example shown in FIG. 2, and a signal having various combinations of waveforms may be used depending on the properties of the ink ejected from the nozzle of the head chip 300, the material of the medium on which the ink lands, and the like. Further, the drive signal COMA1 and the drive signal COMA2 may have different waveforms, and similarly, the drive signal COMB1 and the drive signal COMB2 may have different waveforms.

Figure 3:
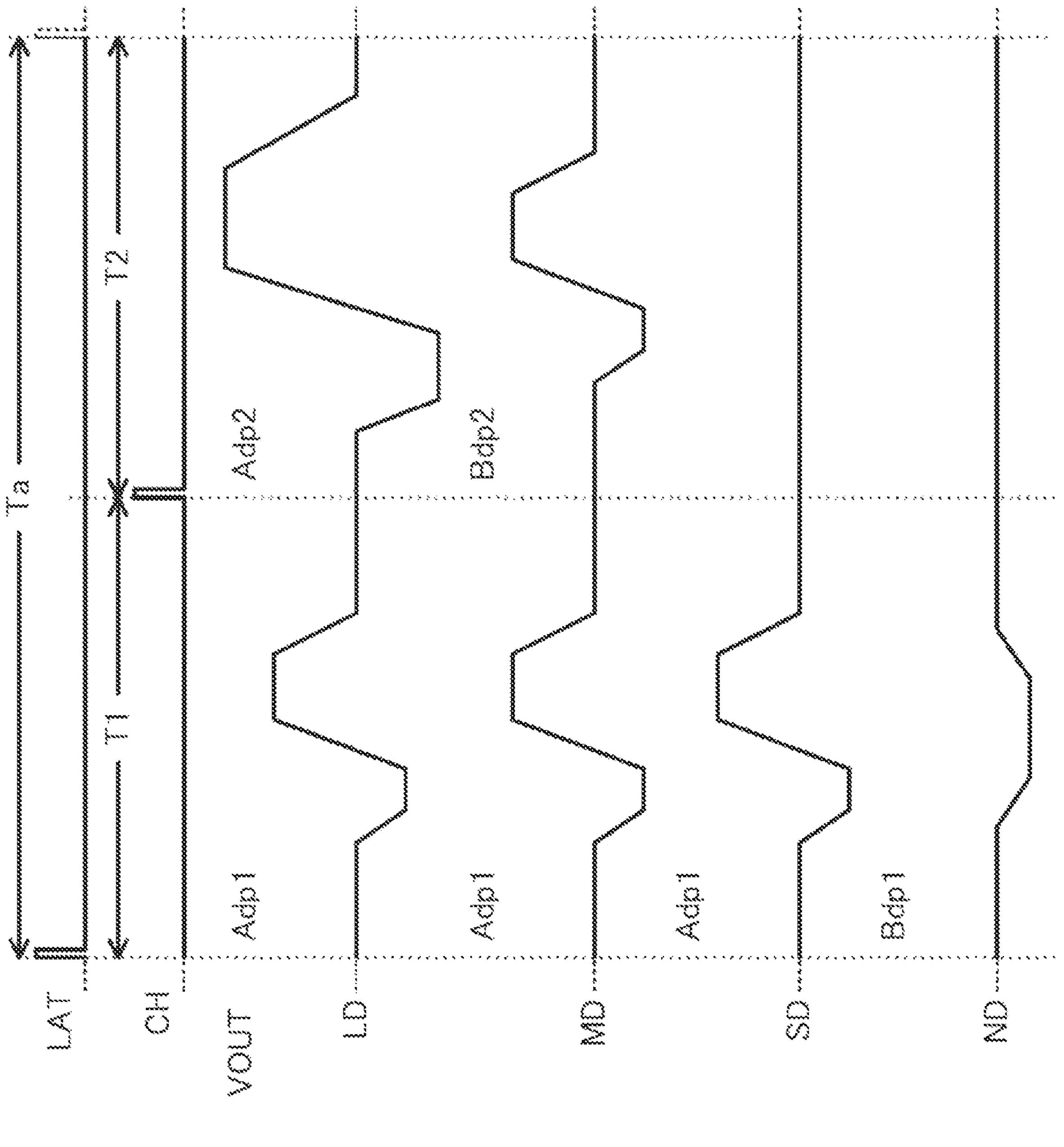
FIG. 3 is a diagram showing an example of a waveform of a drive signal.

FIG. 3 is a diagram showing an example of a waveform of the drive signal VOUT corresponding to each of a large dot LD, a medium dot MD, a small dot SD, and a non-recording ND in the size of the dots formed on the medium.

As shown in FIG. 3, the drive signal VOUT when the large dot LD is formed on the medium is a waveform in which the trapezoidal waveform Adp1 arranged in the period T1 and the trapezoidal waveform Adp2 arranged in the period T2 are continuous in the cycle Ta. When this drive signal VOUT is supplied to the head chip 300, a small amount of ink and a medium amount of ink are ejected from the corresponding nozzles. Therefore, in the cycle Ta, each ink lands on the medium and coalesces, so that the large dot LD is formed on the medium.

Further, the drive signal VOUT when the medium dot MD is formed on the medium is a waveform in which the trapezoidal waveform Adp1 arranged in the period T1 and the trapezoidal waveform Bdp2 arranged in the period T2 are continuous in the cycle Ta. When this drive signal VOUT is supplied to the head chip 300, a small amount of ink is ejected twice from the corresponding nozzles. Therefore, in the cycle Ta, each ink lands on the medium and coalesces, so that the medium dot MD is formed on the medium.

The drive signal VOUT when the small dot SD is formed on the medium is a waveform in which the trapezoidal waveform Adp1 arranged in the period T1 and a constant waveform at the voltage Vc arranged in the period T2 are continuous in the cycle Ta. When this drive signal VOUT is supplied to the head chip 300, a small amount of ink is ejected once from the corresponding nozzle. Therefore, in the cycle Ta, the ink lands on the medium, and the small dot SD is formed on the medium.

The drive signal VOUT corresponding to the non-recording ND that does not form dots on the medium is a waveform in which the trapezoidal waveform Bdp1 arranged in the period T1 and a constant waveform at the voltage Vc arranged in the period T2 are continuous in the cycle Ta. When this drive signal VOUT is supplied to the head chip 300, the ink in the vicinity of the opening of the corresponding nozzle only slightly vibrates, and the ink is not ejected. Therefore, in the cycle Ta, the ink does not land on the medium and dots are not formed on the medium.

Here, the constant waveform at the voltage Vc is the voltage supplied to the head chip 300 when none of the trapezoidal waveforms Adp1, Adp2, Bdp1, and Bdp2 is selected as the drive signal VOUT, and specifically, is a waveform of a voltage value in which a voltage Vc immediately before the trapezoidal waveforms Adp1, Adp2, Bdp1, and Bdp2 is held in the head chip 300. Therefore, when none of the trapezoidal waveforms Adp1, Adp2, Bdp1, and Bdp2 is selected as the drive signal VOUT, the voltage Vc is supplied to the head chip 300 as the drive signal VOUT.

Figure 4:
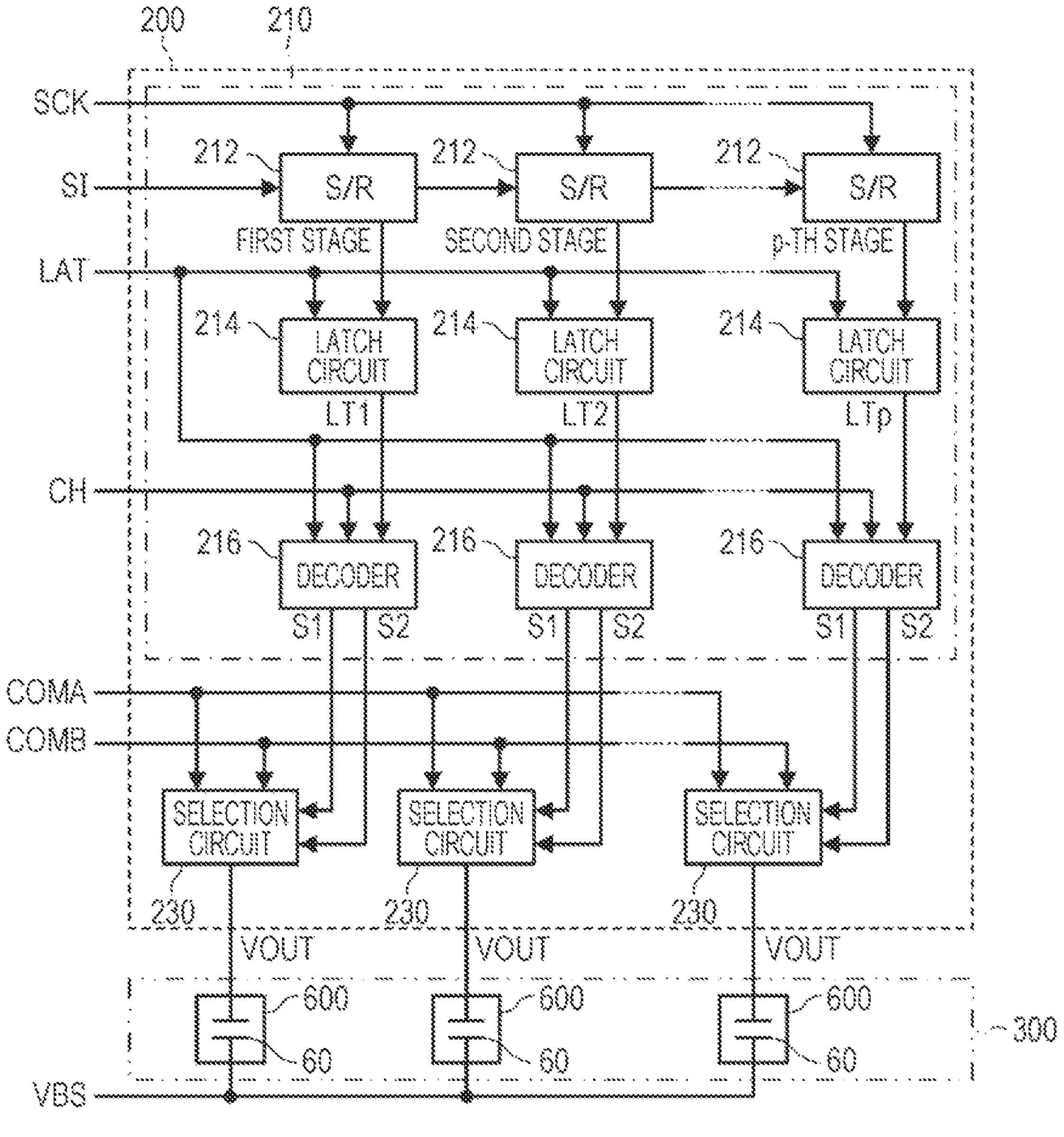
FIG. 4 is a diagram showing a configuration of a drive signal selection circuit.

Next, the configuration and operation of the drive signal selection circuit 200 will be described. FIG. 4 is a diagram showing the configuration of the drive signal selection circuit 200. As shown in FIG. 4, the drive signal selection circuit 200 includes a selection control circuit 210 and a plurality of selection circuits 230. Further, FIG. 4 shows an example of the head chip 300 to which the drive signal VOUT output from the drive signal selection circuit 200 is supplied. As shown in FIG. 4, the head chip 300 includes p ejection portions 600 each having a piezoelectric element 60.

The print data signal SI, the latch signal LAT, the change signal CH, and the clock signal SCK are input to the selection control circuit 210. The selection control circuit 210 is provided with a set of a shift register (S/R) 212, a latch circuit 214, and a decoder 216 corresponding to each of the p ejection portions 600 included in the head chip 300. That is, the drive signal selection circuit 200 includes a set of the same number of shift registers 212, latch circuits 214, and decoders 216 as the p ejection portions 600 included in the head chip 300.

The print data signal SI is a signal synchronized with the clock signal SCK, and a signal having a total of 2p bits including 2-bit print data [SIH, SIL] for selecting one of large dot LD, medium dot MD, small dot SD, and non-recording ND with respect to each of the p ejection portions 600. The input print data signal SI is held in the shift register 212 for each of the two bits of print data [SIH, SIL] included in the print data signal SI, corresponding to the p ejection portions 600. Specifically, in the selection control circuit 210, the p-th stage shift registers 212 corresponding to the p ejection portions 600 are vertically coupled to each other, and the print data [SIH, SIL] serially input as the print data signal SI is sequentially transferred to the subsequent stage according to the clock signal SCK. In FIG. 4, in order to distinguish the shift register 212, the shift register 212 to which the print data signal SI is input is described as a first stage, a second stage, . . . , a p-th stage in order from the upstream.

Each of the p latch circuits 214 latches the 2-bit print data [SIH, SIL] held by each of the p shift registers 212 at the rising edge of the latch signal LAT.

Figures 5, 6:
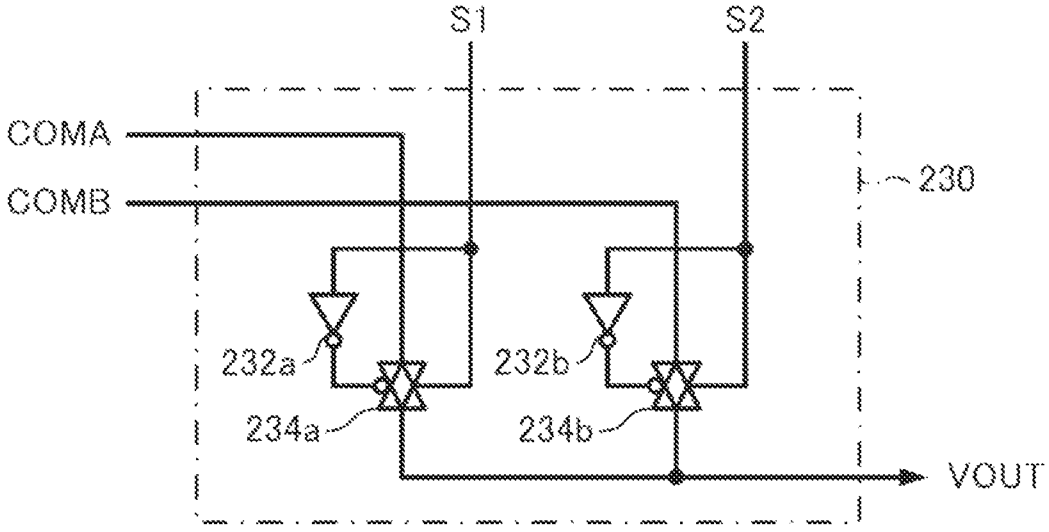
FIG. 5 is a diagram showing decoding contents in a decoder.
FIG. 6 is a diagram showing a configuration of a selection circuit corresponding to one ejection portion.

FIG. 5 is a diagram showing the decoding contents in the decoder 216. The decoder 216 outputs the selection signals S1 and S2 according to the latched 2-bit print data [SIH, SIL]. For example, when the 2-bit print data [SIH, SIL] is [1,0], the decoder 216 outputs the logic level of the selection signal S1 as H and L levels in the periods T1 and T2, and outputs the logic level of the selection signal S2 as L and H levels in the periods T1 and T2 to the selection circuit 230.

The selection circuit 230 is provided corresponding to each of the ejection portions 600. That is, the number of selection circuits 230 included in the drive signal selection circuit 200 is p, which is the same as the number of ejection portions 600 included in the corresponding head chip 300. FIG. 6 is a diagram showing a configuration of a selection circuit 230 corresponding to one ejection portion 600. As shown in FIG. 6, the selection circuit 230 has inverters 232*a* and 232*b*, which are NOT circuits, and transfer gates 234*a* and 234*b*.

The selection signal S1 is input to the positive control end not marked with a circle at the transfer gate 234*a*, while being logically inverted by the inverter 232*a* and input to the negative control end marked with a circle at the transfer gate 234*a*. Further, the drive signal COMA is supplied to the input end of the transfer gate 234*a*. The selection signal S2 is input to the positive control end not marked with a circle at the transfer gate 234*b*, while being logically inverted by the inverter 232*b* and input to the negative control end marked with a circle at the transfer gate 234*b*. Further, the drive signal COMB is supplied to the input end of the transfer gate 234*b*. The output ends of the transfer gates 234*a* and 234*b* are commonly coupled, and the drive signal VOUT is output from the output ends.

Specifically, the transfer gate 234*a* makes between the input end and the output end conductive when the selection signal S1 is H level, and makes between the input end and the output end non-conductive when the selection signal S1 is L level. Further, the transfer gate 234*b* makes between the input end and the output end conductive when the selection signal S2 is H level, and makes between the input end and the output end non-conductive when the selection signal S2 is L level. That is, the selection circuit 230 selects the waveforms of the drive signals COMA and COMB based on the input selection signals S1 and S2, and outputs the drive signal VOUT of the selected waveform.

Figure 7:
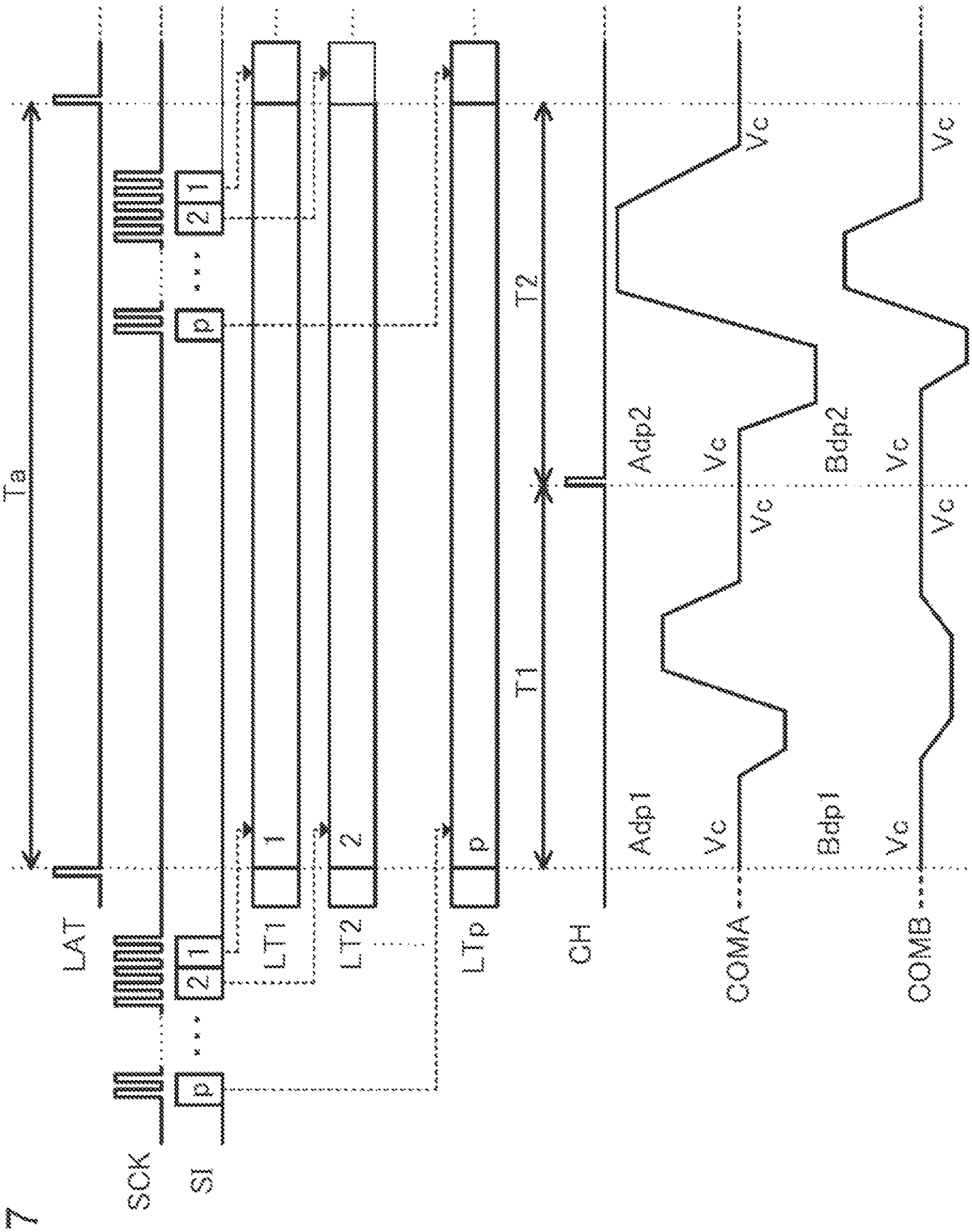
FIG. 7 is a diagram for describing the operation of the drive signal selection circuit.

The operation of the drive signal selection circuit 200 will be described with reference to FIG. 7. FIG. 7 is a diagram for describing the operation of the drive signal selection circuit 200. The print data [SIH, SIL] included in the print data signal SI is serially input in synchronization with the clock signal SCK, and is sequentially transferred in the shift register 212 corresponding to the ejection portion 600. When the input of the clock signal SCK is stopped, the 2-bit print data [SIH, SIL] corresponding to each of the p ejection portions 600 is held in each shift register 212. The print data [SIH, SIL] included in the print data signal SI is input in the order corresponding to the p-th stage, . . . , second stage, and first stage ejection portion 600 of the shift register 212.

When the latch signal LAT rises, each of the latch circuits 214 latches the 2-bit print data [SIH, SIL] held in the shift register 212 all at once. In FIG. 7, LT1, LT2, . . . , LTp represent 2-bit print data [SIH, SIL] latched by the latch circuit 214 corresponding to the shift register 212 of the first stage, the second stage, . . . , and the p-th stage.

The decoder 216 outputs the logic levels of the selection signals S1 and S2 as the contents shown in FIG. 5 in each of the periods T1 and T2 depending on the dot size defined by the latched 2-bit print data [SIH, SIL].

Specifically, when the input print data [SIH, SIL] is [1,1], the decoder 216 sets the selection signal S1 to H and H levels in the periods T1 and T2, and sets the selection signal S2 to L and L levels in the periods T1 and T2. In this case, the selection circuit 230 selects the trapezoidal waveform Adp1 in the period T1 and selects the trapezoidal waveform Adp2 in the period T2. As a result, the drive signal VOUT corresponding to the large dot LD shown in FIG. 3 is generated.

When the input print data [SIH, SIL] is [1,0], the decoder 216 sets the selection signal S1 to H and L levels in the periods T1 and T2, and sets the selection signal S2 to L and H levels in the periods T1 and T2. In this case, the selection circuit 230 selects the trapezoidal waveform Adp1 in the period T1 and selects the trapezoidal waveform Bdp2 in the period T2. As a result, the drive signal VOUT corresponding to the medium dot MD shown in FIG. 3 is generated.

When the input print data [SIH, SIL] is [0,1], the decoder 216 sets the selection signal S1 to H and L levels in the periods T1 and T2, and sets the selection signal S2 to L and L levels in the periods T1 and T2. In this case, the selection circuit 230 selects the trapezoidal waveform Adp1 in the period T1 and does not select either the trapezoidal waveform Adp2 or Bdp2 in the period T2. As a result, the drive signal VOUT corresponding to the small dot SD shown in FIG. 3 is generated.

When the input print data [SIH, SIL] is [0,0], the decoder 216 sets the selection signal S1 to L and L levels in the periods T1 and T2, and sets the selection signal S2 to H and L levels in the periods T1 and T2. In this case, the selection circuit 230 selects the trapezoidal waveform Bdp1 in the period T1 and does not select either the trapezoidal waveform Adp2 or Bdp2 in the period T2. As a result, the drive signal VOUT corresponding to the non-recording ND shown in FIG. 3 is generated.

As described above, the drive signal selection circuit 200 selects the waveforms of the drive signals COMA and COMB based on the print data signal SI, the latch signal LAT, the change signal CH, and the clock signal SCK, and outputs the waveforms as the drive signal VOUT. Then, the drive signal selection circuit 200 selects or does not select the waveforms of the drive signals COMA and COMB, thereby controlling the size of the dots formed on the medium, and as a result, in the liquid ejecting apparatus 1, dots of a desired size are formed on the medium.

Here, the drive signals COMA and COMB output by the drive signal output unit 50 are examples of drive signals. Further, considering that the drive signal selection circuit 200 generates the drive signal VOUT by selecting or not selecting the waveforms included in the drive signals COMA and COMB, the drive signal VOUT is also an example of the drive signal.

3. Configuration of Drive Circuit

Next, the configurations of the drive circuits 51*a* and 51*b* included in the drive signal output unit 50 will be described. The drive circuit 51*a* and the drive circuit 51*b* have the same configuration except that the input signal and the output signal are different. Therefore, in the following description, the configuration will be described by taking as an example the drive circuit 51*a* in which the basic drive data dA is input and the drive signal COMA is output, and the description of the configuration of the drive circuit 51*b* will be omitted.

Figure 8:
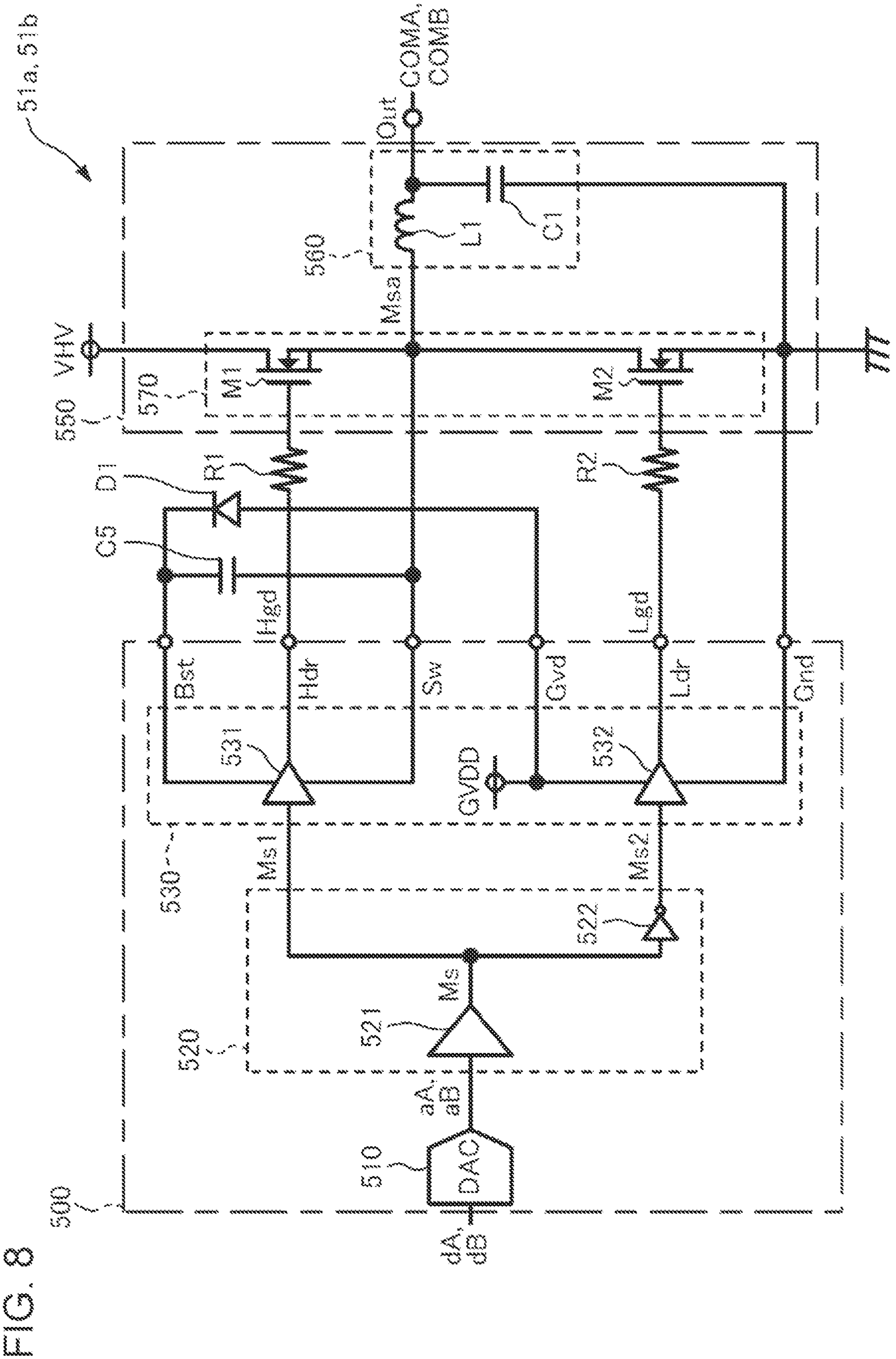
FIG. 8 is a diagram showing a configuration of a drive circuit.

FIG. 8 is a diagram showing a configuration of the drive circuit 51*a*. The drive circuit 51*a* includes a digital to analog converter (DAC) 510 that converts the basic drive data dA, that is a digital signal which is the basis of the drive signal COMA, into a basic drive signal aA that is an analog signal, and an output circuit 550 that amplifies a signal based on the basic drive signal aA and generates the drive signal COMA.

As shown in FIG. 8, the drive circuit includes an integrated circuit 500, an output circuit 550, and a plurality of circuit elements. The integrated circuit 500 outputs gate drive signals Hgd and Lgd for driving transistors M1 and M2 included in an amplifier circuit 570 of the output circuit 550 based on the input basic drive data dA. The integrated circuit 500 includes a DAC 510, a modulation circuit 520 and a gate drive circuit 530.

The basic drive data dA is input to the DAC 510. The DAC 510 generates the basic drive signal aA of the analog signal by digital-to-analog converting the basic drive data dA. The signal obtained by amplifying the voltage of the basic drive signal aA becomes the drive signal COMA. That is, the basic drive signal aA is a target signal before amplification of the drive signal COMA defined by the basic drive data dA of the digital signal.

The modulation circuit 520 includes a comparator 521 and an inverter 522. The basic drive signal aA is input to the comparator 521. The comparator 521 outputs a modulation signal Ms that becomes H level when the voltage value of the basic drive signal aA rises and becomes a predetermined voltage threshold Vth1 or more, and that becomes L level when the voltage value of the basic drive signal aA decreases and falls below a predetermined voltage threshold Vth2.

The modulation signal Ms output from the comparator 521 is branched in the modulation circuit 520. One of the branched modulation signals Ms is output to the gate drive circuit 530 as a modulation signal Ms1. Further, the other of branched modulation signals Ms is output to the gate drive circuit 530 as a modulation signal Ms2 via the inverter 522. That is, the modulation circuit 520 generates two modulation signals Ms1 and Ms2 having exclusive logic levels and outputs the modulation signals to the gate drive circuit 530. Here, the two signals having exclusive logic levels include signals whose timing is controlled by a delay circuit (not shown) or the like so that the logic levels of each other's signals do not become H level at the same time. That is, the two signals of the exclusive logic levels include signals that do not become H level at the same time.

The gate drive circuit 530 includes gate drivers 531 and 532. The gate driver 531 generates a gate drive signal Hgd by level-shifting the voltage value of the modulation signal Ms1 output from the modulation circuit 520, and outputs the gate drive signal from a terminal Hdr. Specifically, of the power supply voltage of the gate driver 531, a voltage is supplied to the high potential side via a terminal Bst, and a voltage is supplied to the low potential side via a terminal Sw. The terminal Bst is commonly coupled to one end of a capacitor C5 provided outside the integrated circuit 500 and the cathode terminal of a diode D1 for preventing backflow. Further, the other end of the capacitor C5 is coupled to the terminal Sw. Further, the anode terminal of the diode D1 is coupled to a terminal Gvd. A voltage GVDD of the predetermined voltage value described above is supplied to the terminal Gvd. Therefore, the potential difference between the terminal Bst and the terminal Sw is approximately equal to the potential difference between both ends of the capacitor C5, that is, the voltage GVDD. The gate driver 531 generates a gate drive signal Hgd whose voltage value is larger than that of the terminal Sw by the voltage GVDD according to the input modulation signal Ms1, and outputs the gate drive signal from the terminal Hdr.

The gate driver 532 operates on the lower potential side than the gate driver 531. The gate driver 532 generates a gate drive signal Lgd by level-shifting the voltage value of the modulation signal Ms2 output from the modulation circuit 520, and outputs the gate drive signal from a terminal Ldr. Specifically, of the power supply voltage of the gate driver 532, a voltage GVDD is supplied to the high potential side, and a ground signal is supplied to the low potential side. The gate driver 532 generates a gate drive signal Lgd whose voltage value is larger than that of the terminal Gnd by the voltage GVDD according to the input modulation signal Ms2, and outputs the gate drive signal from the terminal Ldr.

Here, the voltage GVDD is generated, for example, by boosting the voltage VDD. Specifically, the voltage GVDD is a voltage whose voltage value is larger than a gate drive threshold voltage of the transistors M1 and M2 included in the amplifier circuit 570 to be described later, and is generated by boosting the voltage VDD so as to be, for example, DC 7.5 V.

The output circuit 550 includes an amplifier circuit 570 and a smoothing circuit 560. Further, the amplifier circuit 570 has transistors M1 and M2. Each of the transistors M1 and M2 shown in FIG. 8 may be, for example, a surface mount type N-channel type field effect transistor (FET).

A voltage VHV is supplied to the drain electrode of the transistor M1. Further, the gate electrode of the transistor M1 is coupled to one end of a resistor R1. The other end of the resistor R1 is coupled to the terminal Hdr. Further, the source electrode of the transistor M1 is coupled to the terminal Sw. The transistor M1 coupled as described above operates according to the gate drive signal Hgd output from the terminal Hdr.

The drain electrode of the transistor M2 is coupled to the source electrode of the transistor M1. Further, the gate electrode of the transistor M2 is coupled to one end of a resistor R2. The other end of the resistor R2 is coupled to the terminal Ldr. Further, a ground signal is supplied to the source electrode of the transistor M2. The transistor M2 coupled as described above operates according to the gate drive signal Lgd output from the terminal Ldr.

In the amplifier circuit 570 configured as described above, when the transistor M1 is controlled to be off and the transistor M2 is controlled to be on, the coupling point to which the terminal Sw is coupled becomes a ground potential. Therefore, the voltage GVDD is supplied to the terminal Bst. On the other hand, when the transistor M1 is controlled to be on and the transistor M2 is controlled to be off, the voltage VHV is supplied to the coupling point to which the terminal Sw is coupled. Therefore, the voltage VHV+voltage GVDD is supplied to the terminal Bst.

Here, the gate driver 531 that drives the transistor M1 drives the capacitor C5 as a floating power supply. Then, in response to the operation of the transistors M1 and M2, the voltage of the terminal Sw to which one end of the capacitor C5 is coupled changes to the ground potential or the voltage VHV, so that the gate driver 531 generates a gate drive signal Hgd having L level of voltage VHV and H level of voltage VHV+voltage GVDD, and supplies the gate drive signal to the gate electrode of the transistor M1. The transistor M1 performs a switching operation based on the gate drive signal Hgd supplied to the gate electrode. Further, the gate driver 532 that drives the transistor M2 generates a gate drive signal Lgd having L level of the ground potential and H level of the voltage GVDD, regardless of the operation of the transistors M1 and M2, and supplies the gate drive signal to the gate electrode of the transistor M2. The transistor M2 performs a switching operation based on the gate drive signal Lgd supplied to the gate electrode.

Thereby, an amplified modulation signal Msa obtained by amplifying the modulation signal Ms based on the voltage VHV is generated at the coupling point between the source electrode of the transistor M1 and the drain electrode of the transistor M2.

The smoothing circuit 560 includes a coil L1 and a capacitor C1. One end of the coil L1 is commonly coupled to the source electrode of the transistor M1 and the drain electrode of the transistor M2. Further, the other end of the coil L1 is commonly coupled to a terminal Out from which the drive signal COMA is output and one end of the capacitor C1. Further, a ground signal is supplied to the other end of the capacitor C1. That is, the smoothing circuit 560 constitutes a low-pass filter circuit with the coil L1 and the capacitor C1. The smoothing circuit 560 coupled as described above smoothes the amplified modulation signal Msa supplied to the coupling point between the transistors M1 and M2. Thereby, the amplified modulation signal Msa is demodulated and the drive signal COMA is generated. Then, the generated drive signal COMA is output from the terminal Out.

Although not shown in FIG. 8, the drive circuit 51*a* may include a feedback circuit that feeds back the output drive signal COMA. As a result, the operating characteristics of the drive circuit 51 are stabilized, and the possibility of waveform distortion occurring in the drive signal COMA output by the drive circuit 51*a* can be reduced.

4. Structure of Liquid Ejecting Apparatus

Figure 9:
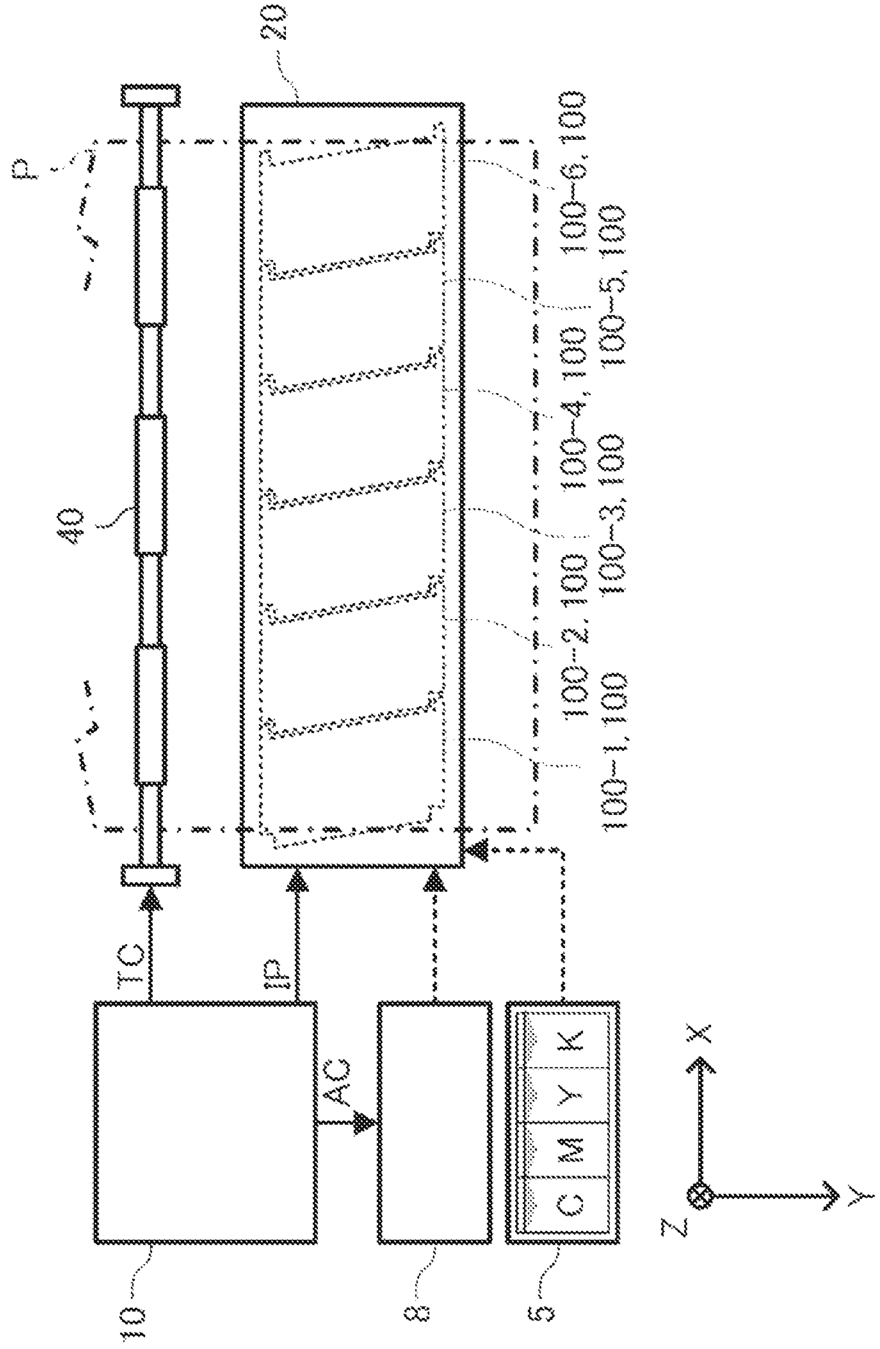
FIG. 9 is an explanatory diagram showing a schematic structure of the liquid ejecting apparatus.

Next, the schematic structure of the liquid ejecting apparatus 1 will be described. FIG. 9 is an explanatory diagram showing a schematic structure of the liquid ejecting apparatus 1. FIG. 9 shows arrows indicating the X direction, the Y direction, and the Z direction that are orthogonal to each other. The Y direction corresponds to the direction in which the medium P is transported, the X direction is a direction orthogonal to the Y direction and parallel to the horizontal plane and corresponds to the main scanning direction, and the Z direction is the up-and-down direction of the liquid ejecting apparatus 1 and corresponds to the vertical direction. Here, in the following description, when the orientations of the X direction, the Y direction, and the Z direction are specified, in some cases, the tip end side of the arrow indicating the X direction is referred to as a +X side, and the starting point side thereof is referred to as a −X side, the tip end side of the arrow indicating the Y direction is referred to as a +Y side, and the starting point side thereof is referred to as a −Y side, and the tip end side of the arrow indicating the Z direction is referred to as a +Z side, and the starting point side thereof is referred to as a −Z side.

As shown in FIG. 9, the liquid ejecting apparatus 1 includes a liquid container 5, a pump 8, and a transport mechanism 40 in addition to the control unit 10 and the head unit 20 described above. Here, although not shown in FIG. 9, the drive signal output unit 50 is located on the −Z side of the head unit 20. In the following description, a case where the head unit 20 has six ejection heads 100 will be exemplified and described.

As described above, the control unit 10 includes the main control circuit 11 and the power supply voltage generation circuit 12, and controls the operation of the liquid ejecting apparatus 1 including the head unit 20. Further, the control unit 10 may include an interface circuit or the like for communicating with a storage circuit for storing various information and a host computer provided outside the liquid ejecting apparatus 1 in addition to the main control circuit 11 and the power supply voltage generation circuit 12.

The control unit 10 receives an image signal input from a host computer or the like provided outside the liquid ejecting apparatus 1, performs predetermined image processing on the received image signal, and then outputs the image-processed signal to the head unit 20 as an image information signal IP. Further, the control unit 10 controls the transport of the medium P by outputting a transport control signal TC to the transport mechanism 40 that transports the medium P, and controls the operation of the pump 8 by outputting a pump control signal AC to the pump 8.

The liquid container 5 stores ink to be ejected to the medium P. Specifically, the liquid container 5 includes four containers in which four color inks of cyan C, magenta M, yellow Y, and black K are individually stored. The ink stored in the liquid container 5 is supplied to the head unit 20 via a tube or the like. The container in which the ink contained in the liquid container 5 is stored is not limited to four, and may include a container in which inks of colors other than cyan C, magenta M, yellow Y, and black K are stored, and include a plurality of containers of any one of cyan C, magenta M, yellow Y, and black K.

Here, a solvent of the ink stored in the liquid container 5 in the present embodiment contains 1-methyl-2-pyrrolidone. The solvent containing 1-methyl-2-pyrrolidone contains dyes and pigments corresponding to the type of the medium P to be ejected, so that ink of a desired color such as cyan C, magenta M, yellow Y, and black K is formed. Then, the ink is ejected onto the medium P and landed on the medium P to form an image of a desired color on the medium P. Since the 1-methyl-2-pyrrolidone has extremely high solubility, high boiling point, and low freezing point, when used as an ink solvent, it is possible to select a wide variety of substances as ink dyes and pigments. Therefore, 1-methyl-2-pyrrolidone is contained in an ink solvent having a wide variety of physical properties depending on the application in which the liquid ejecting apparatus 1 is used.

The head unit 20 includes ejection heads 100-1 to 100-6 arranged side by side in the X direction. The ejection heads 100-1 to 100-6 included in the head unit 20 are arranged side by side in the order of the ejection head 100-1, the ejection head 100-2, and the ejection head 100-3, the ejection head 100-4, the ejection head 100-5, and the ejection head 100-6 from the −X side to the +X side so as to be equal to or larger than the width of the medium P along the X direction. The head unit 20 distributes the ink supplied from the liquid container 5 to each of the ejection heads 100-1 to 100-6, and operates based on the image information signal IP input from the control unit 10 and the drive signals COMA and COMB output by the drive signal output unit 50, respectively, of the ejection heads 100-1 to 100-6. Thus, the ink supplied from the liquid container 5 is ejected from each of the ejection heads 100-1 to 100-6 toward the medium P.

The transport mechanism 40 transports the medium P along the Y direction based on the transport control signal TC input from the control unit 10. Such a transport mechanism 40 includes, for example, a roller (not shown) for transporting the medium P, a motor for rotating the roller, and the like.

The pump 8 controls whether or not to supply air A to the head unit 20 and the amount of the air A supplied to the head unit 20 based on the pump control signal AC input from the control unit 10. The pump 8 is coupled to the head unit 20 via, for example, two tubes. The pump 8 controls the opening and closing of the valve of the head unit 20 by controlling the air A flowing through each tube.

As described above, in the liquid ejecting apparatus 1, the control unit 10 generates an image information signal IP based on the image signal input from the host computer or the like, controls the operation of the head unit 20 by the generated image information signal IP, and controls the transport of the medium P in the transport mechanism 40 by the transport control signal TC. Thereby, the liquid ejecting apparatus 1 can land the ink at a desired position on the medium P, and thus can form a desired image on the medium P.

5. Structure of Head Unit

Figure 10:
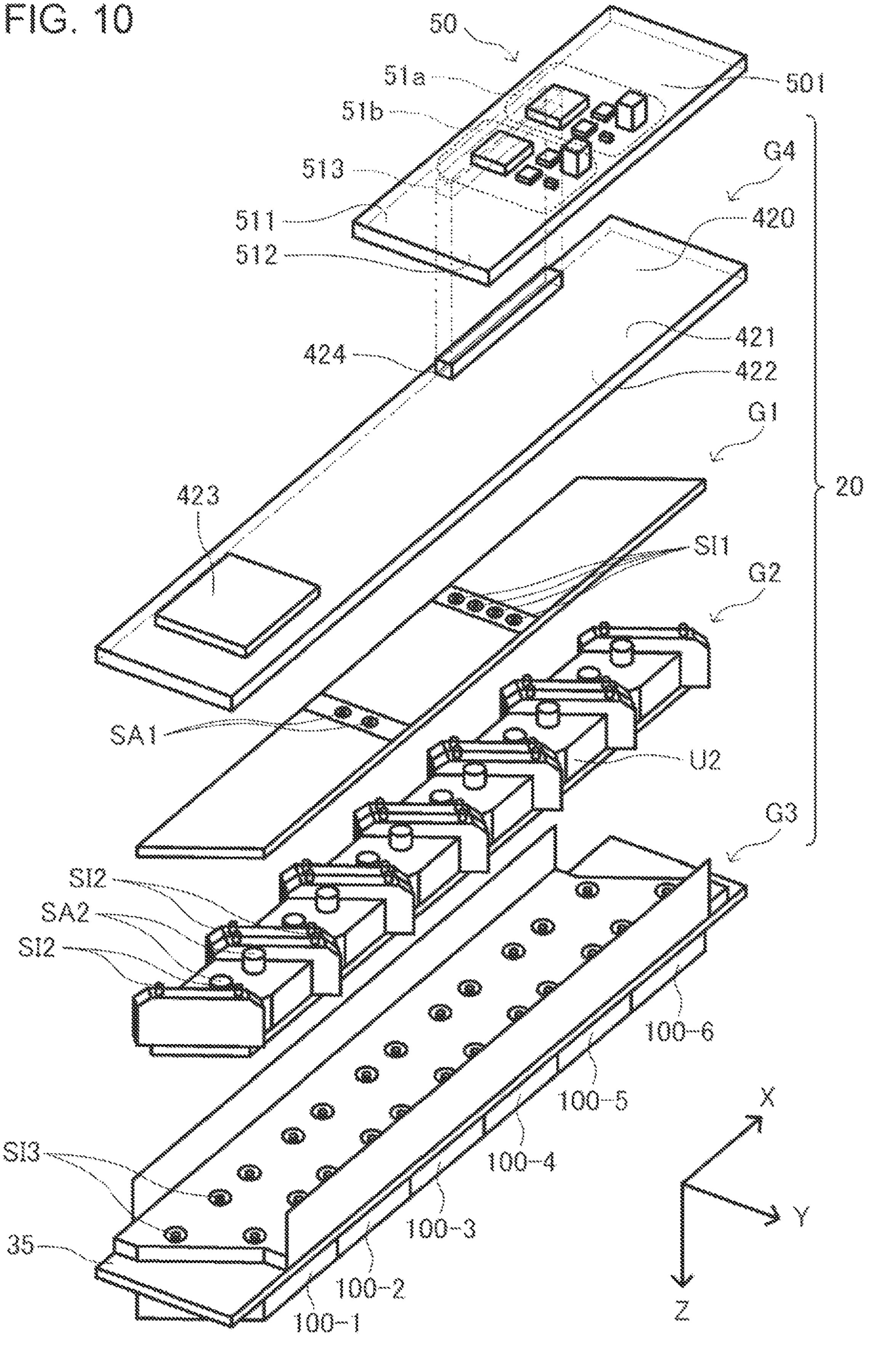
FIG. 10 is an exploded perspective view of a head unit and a drive signal output unit when viewed from a −Z side.

Next, the structures of the head unit 20 and the drive signal output unit 50 will be described. FIG. 10 is an exploded perspective view of the head unit 20 and the drive signal output unit 50 when viewed from the −Z side, and FIG. 11 is an exploded perspective view of the head unit 20 and the drive signal output unit 50 when viewed from the +Z side.

Figure 11:
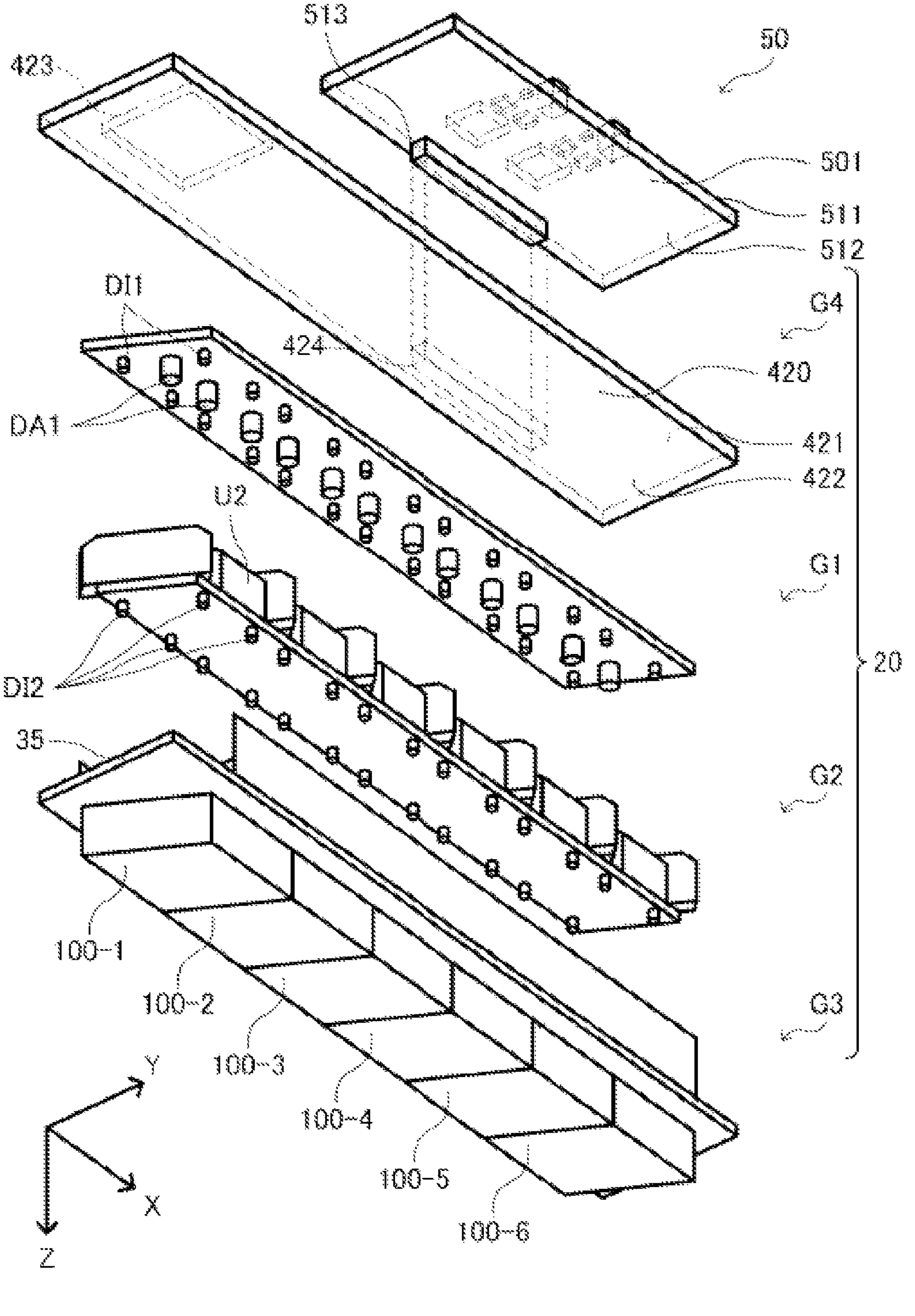
FIG. 11 is an exploded perspective view of the head unit and the drive signal output unit when viewed from a +Z side.

As shown in FIGS. 10 and 11, the head unit 20 includes a flow path structure G1 that introduces ink from the liquid container 5, a supply control portion G2 that controls the supply of the introduced ink into the ejection head 100, a liquid ejection portion G3 having the ejection head 100 for ejecting the supplied ink, and an ejection control portion G4 that controls the ejection of ink from the ejection head 100. Then, the flow path structure G1, the supply control portion G2, the liquid ejection portion G3, and the ejection control portion G4 are laminated in the order of the ejection control portion G4, the flow path structure G1, the supply control portion G2, and the liquid ejection portion G3 from the −Z side to the +Z side along the Z direction in the head unit 20, and are fixed to each other by a fixing means (not shown).

As shown in FIGS. 10 and 11, the flow path structure G1 has a plurality of liquid introduction ports SI1 according to the type of ink supplied to the head unit 20, the number of ink types, and a plurality of liquid discharge ports DI1 according to the type of ink and the number of ejection heads 100. The plurality of liquid introduction ports SI1 are located on the −Z side surface of the flow path structure G1 and are coupled to the liquid container 5 via a tube (not shown) or the like. Further, the plurality of liquid discharge ports DI1 are located on the +Z side surface of the flow path structure G1. An ink flow path that communicates one liquid introduction port SI1 and a plurality of liquid discharge ports DI1 corresponding to the liquid introduction port SI1 is formed inside the flow path structure G1.

Further, the flow path structure G1 is provided with a plurality of air introduction ports SA1 and a plurality of air discharge ports DA1. The plurality of air introduction ports SA1 are provided on the −Z side surface of the flow path structure G1, and are coupled to the pump 8 via a tube (not shown). Further, the plurality of air discharge ports DA1 are provided on the +Z side surface of the flow path structure G1. An air flow path that communicates one air introduction port SA1 and a plurality of air discharge ports DA1 corresponding to the air introduction port SA1 is formed inside the flow path structure G1.

As shown in FIGS. 10 and 11, the supply control portion G2 has a plurality of pressure adjusting units U2 according to the number of ejection heads 100. Further, each of the plurality of pressure adjusting units U2 has a plurality of liquid introduction ports SI2 according to the type of ink supplied to the head unit 20, a plurality of liquid discharge ports DI2 according to the type of ink supplied to the head unit 20, and a plurality of air introduction ports SA2 according to the number of tubes coupled to the pump 8.

The plurality of liquid introduction ports SI2 are located on the −Z side of the pressure adjusting unit U2 and are coupled to the plurality of liquid discharge ports DI1 included in the flow path structure G1 on a one-to-one basis. That is, the supply control portion G2 has a liquid introduction port SI2 corresponding to each of the liquid discharge ports DI1 included in the flow path structure G1. Further, the plurality of liquid discharge ports DI2 are located on the −Z side of the pressure adjusting unit U2. An ink flow path that communicates one liquid introduction port SI2 and one liquid discharge port DI2 is formed inside the pressure adjusting unit U2.

The plurality of air introduction ports SA2 are located on the −Z side of the pressure adjusting unit U2 and are coupled to the plurality of air discharge ports DA1 included in the flow path structure G1 on a one-to-one basis. That is, the supply control portion G2 has an air introduction port SA2 corresponding to each of the air discharge port DA1 included in the flow path structure G1. Further, inside each of the pressure adjusting units U2, a supply control means (not shown) for controlling the supply of ink to the ejection head 100 is provided, including a valve for opening and closing the ink flow path, a valve for adjusting the pressure of the ink flowing through the ink flow path, and the like. An air flow path coupling one air introduction port SA2 and one supply control means is formed inside the pressure adjusting unit U2.

The pressure adjusting unit U2 configured as described above controls the operation of the valve included in the supply control means based on the air A supplied via the air flow path formed inside, thereby controlling the amount of ink flowing in the ink flow path formed inside the pressure adjusting unit U2.

As shown in FIGS. 10 and 11, the liquid ejection portion G3 has ejection heads 100-1 to 100-6 and a support member 35. Each of the ejection heads 100-1 to 100-6 is located on the +Z side of the support member 35. The ejection heads 100-1 to 100-6 are fixed to the support member 35 by a fixing means such as screws.

A plurality of liquid introduction ports SI3 are located on the −Z side of each of the ejection heads 100-1 to 100-6. Further, the support member 35 is formed with openings corresponding to the plurality of liquid introduction ports SI3. Then, by inserting the corresponding openings formed in the support member 35 through each of the plurality of liquid introduction ports SI3, each of the plurality of liquid introduction ports SI3 is exposed on the −Z side of the liquid ejection portion G3. The plurality of liquid introduction ports SI3 exposed on the −Z side of the liquid ejection portion G3 are coupled to the plurality of liquid discharge ports DI2 included in the supply control portion G2 on a one-to-one basis. That is, the liquid ejection portion G3 has a liquid introduction port SI3 corresponding to each of the liquid discharge ports DI2 included in the supply control portion G2.

Here, the flow of ink until the ink supplied from the liquid container 5 reaches the ejection head 100 will be described. The ink stored in the liquid container 5 is first supplied to the plurality of liquid introduction ports SI1 included in the flow path structure G1 via a tube (not shown) or the like. The ink supplied to the plurality of liquid introduction ports SI1 is distributed by an ink flow path (not shown) provided inside the flow path structure G1, and then supplied to the liquid introduction port SI2 included in the pressure adjusting unit U2 via the liquid discharge port DI1. The ink supplied to the liquid introduction port SI2 is supplied to the liquid introduction port SI3 included in each of the ejection heads 100-1 to 100-6 included in the liquid ejection portion G3 via the ink flow path provided inside the pressure adjusting unit U2 and the liquid discharge port DI2. That is, the flow path structure G1 functions as a distribution flow path member that distributes and supplies ink to each of the plurality of ejection heads 100 included in the head unit 20, and ink whose flow rate and pressure have been adjusted by the pressure adjusting unit U2 included in the supply control portion G2 is supplied to the ejection heads 100-1 to 100-6 included in the liquid ejection portion G3.

Figure 12:
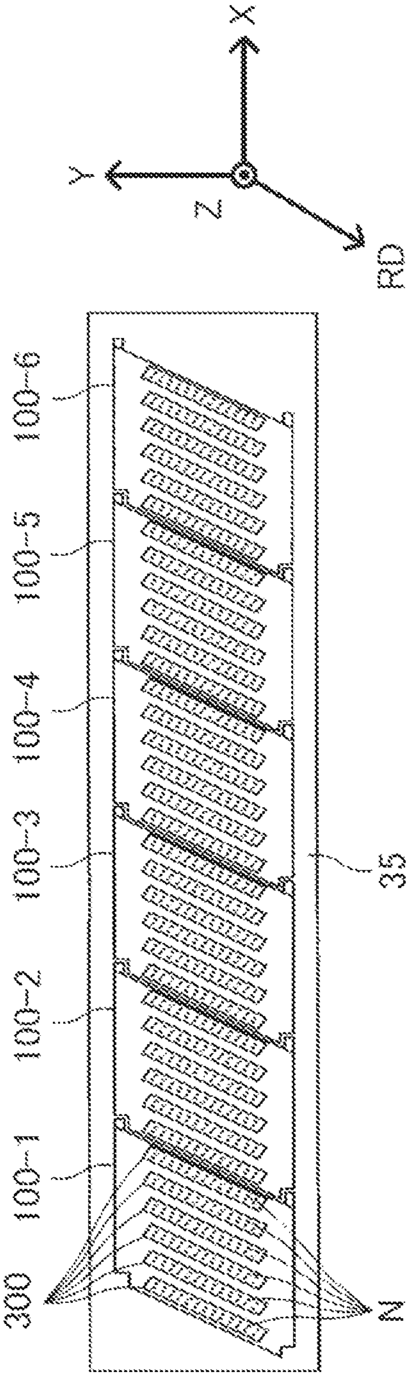
FIG. 12 is a bottom view of the head unit when viewed from the +Z side.

Here, an example of the arrangement of the ejection heads 100-1 to 100-6 in the head unit 20 will be described. FIG. 12 is a bottom view of the head unit 20 when viewed from the +Z side. As shown in FIG. 12, each of the ejection heads 100-1 to 100-6 included in the head unit 20 has six head chips 300 arranged side by side in the X direction. Each head chip 300 has a plurality of nozzles N for ejecting ink. The plurality of nozzles N included in each of the head chips 300 are arranged side by side along a row direction RD different from the X direction and the Y direction in a plane perpendicular to the Z direction and formed by the X direction and the Y direction. Here, in the following description, a plurality of nozzles N arranged side by side along the row direction RD may be referred to as a nozzle row.

Here, FIG. 12 shows a case where the head chip 300 has two rows of nozzle rows along the row direction RD, but the nozzle rows of the ejection head 100 are not limited to two rows. Further, FIG. 12 shows a case where each of the ejection heads 100-1 to 100-6 has six head chips 300, but the number of head chips 300 included in each of the ejection heads 100-1 to 100-6 may be two or more, and is not limited to six.

Figure 13:
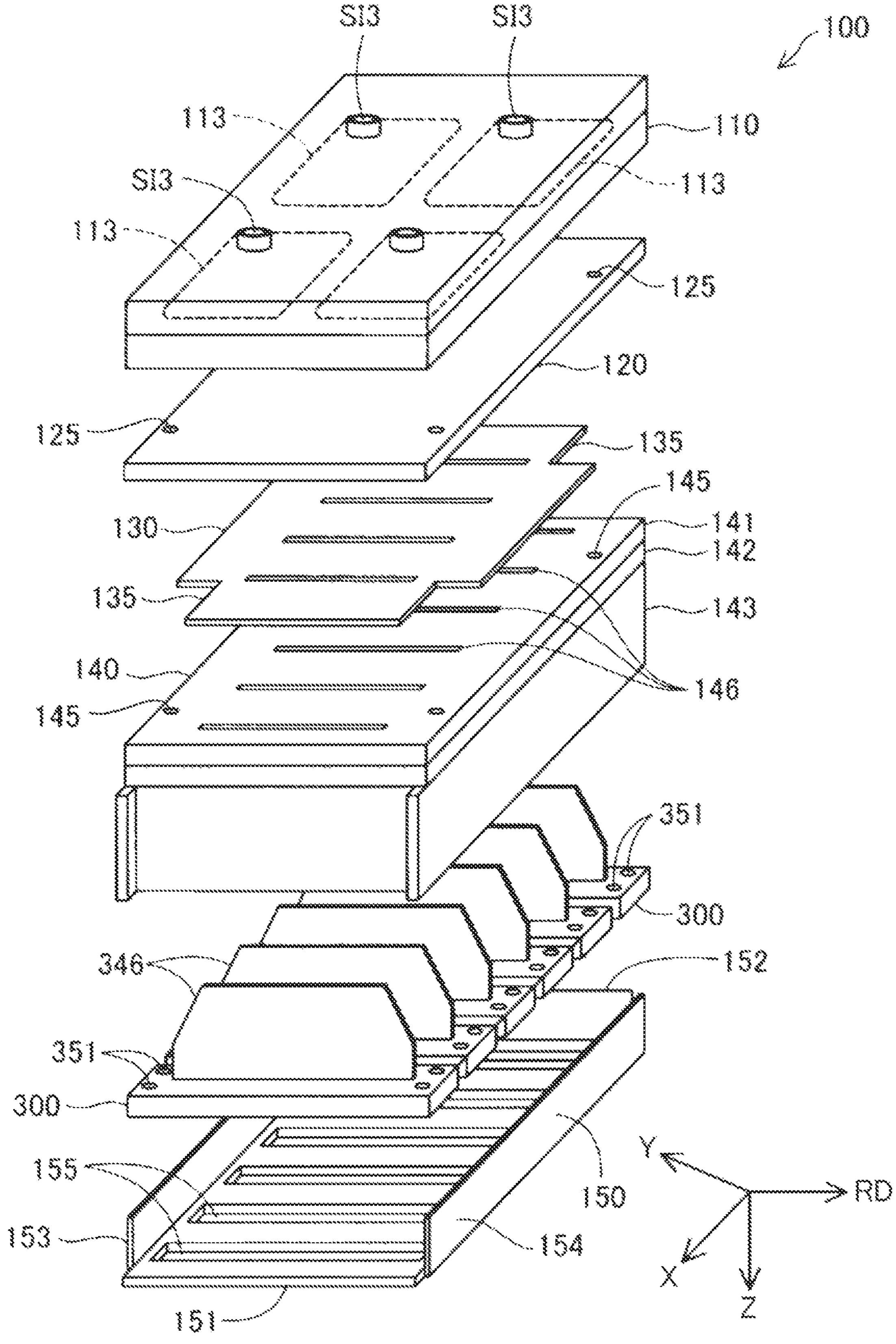
FIG. 13 is an exploded perspective view showing a structure of an ejection head.

Next, a structure of the ejection head 100 will be described. FIG. 13 is an exploded perspective view showing a structure of the ejection head 100. The ejection head 100 includes a filter portion 110, a seal member 120, a wiring substrate 130, a holder 140, six head chips 300, and a fixing plate 150. The ejection head 100 is configured by superimposing the filter portion 110, the seal member 120, the wiring substrate 130, the holder 140, and the fixing plate 150 in this order from the −Z side to the +Z side along the Z direction, and six head chips 300 are accommodated between the holder 140 and the fixing plate 150.

The filter portion 110 has a substantially parallelogram shape in which two opposite sides extend along the X direction and two opposite sides extend along the row direction RD. The filter portion 110 includes a plurality of liquid introduction ports SI3 and a plurality of filters 113 corresponding to each of the plurality of liquid introduction ports SI3. The filter 113 collects air bubbles and foreign substances contained in the ink supplied from each of the liquid introduction ports SI3.

The seal member 120 is located on the +Z side of the filter portion 110, and has a substantially parallelogram shape in which two opposite sides extend along the X direction and two opposite sides extend along the row direction RD. Through-holes 125 through which the ink supplied from the filter portion 110 flows are provided at the four corners of the seal member 120. Such a seal member 120 is formed of, for example, an elastic member such as rubber. The seal member 120 allows liquid-tight communication between a liquid discharge hole (not shown) that communicates with the liquid introduction port SI3 via the filter 113 formed on the +Z side surface of the filter portion 110, and a liquid introduction port 145 of the holder 140, which will be described later.

The wiring substrate 130 is located on the +Z side of the seal member 120, and has a substantially parallelogram shape in which two opposite sides extend along the X direction and two opposite sides extend along the row direction RD. Notches 135 are formed at the four corners of the wiring substrate 130. An ink flow path formed between a liquid discharge hole (not shown) communicating with the liquid introduction port SI3 and a liquid introduction port 145 of the holder 140, which will be described later, which is communicated with the through-hole 125 of the seal member 120, is located in the notch 135. The wiring substrate 130 is formed with wiring for propagating various signals such as the drive signals COMA and COMB and the voltage VHV supplied to the ejection head 100.

The holder 140 is located on the +Z side of the wiring substrate 130, and has a substantially parallelogram shape in which two opposite sides extend along the X direction and two opposite sides extend along the row direction RD. The holder 140 has holder members 141, 142, and 143. The holder members 141, 142, and 143 are laminated in the order of the holder member 141, the holder member 142, and the holder member 143 from the −Z side to the +Z side along the Z direction.

Inside the holder member 143, an opening is provided on the +Z side, and an accommodation space (not shown) for accommodating the head chip 300 is formed. Six head chips 300 are accommodated in the accommodation space formed inside the holder member 143. Further, the holder 140 is provided with slit holes 146 corresponding to each of the six head chips 300. A flexible wiring substrate 346 for propagating various signals such as the drive signals COMA and COMB and the voltage VHV to the head chip 300 is inserted into the slit hole 146. Accordingly, various signals such as the drive signals COMA and COMB and the voltage VHV are supplied to the six head chips 300 accommodated in the accommodation space formed inside the holder member 143. The accommodation space formed inside the holder member 143 may be six spaces corresponding to the six head chips 300, or one space commonly provided in the six head chips 300.

Further, four liquid introduction ports 145 are provided at the four corners of the upper surface of the holder 140. As described above, each of the liquid introduction ports 145 is coupled to the through-hole 125 provided in the seal member 120. Accordingly, ink is supplied to the liquid introduction port 145. Then, the ink introduced into the liquid introduction port 145 is distributed to the six head chips 300 by the ink flow path provided inside the holder 140.

The fixing plate 150 is located on the +Z side of the holder 140 and seals the accommodation space formed inside the holder member 143. The fixing plate 150 has a flat surface portion 151 and bent portions 152, 153, and 154. The flat surface portion 151 has a substantially parallelogram shape in which two opposite sides extend along the X direction and two opposite sides extend along the row direction RD. The flat surface portion 151 has six openings 155 corresponding to the head chip 300. The six head chips 300 are fixed to the holder member 143 of the holder 140 and are also fixed to the flat surface portion 151 so that two rows of nozzle rows are exposed via the corresponding openings 155 formed in the flat surface portion 151.

The bent portion 152 is a member that is coupled to one side extending along the X direction of the flat surface portion 151 and is integrated with the flat surface portion 151 bent to the −Z side, the bent portion 153 is a member that is coupled to one side extending along the row direction RD of the flat surface portion 151 and is integrated with the flat surface portion 151 bent to the −Z side, and the bent portion 154 is a member that is coupled to the other side extending along the row direction RD of the flat surface portion 151 and is integrated with the flat surface portion 151 bent to the −Z side.

Figure 14:
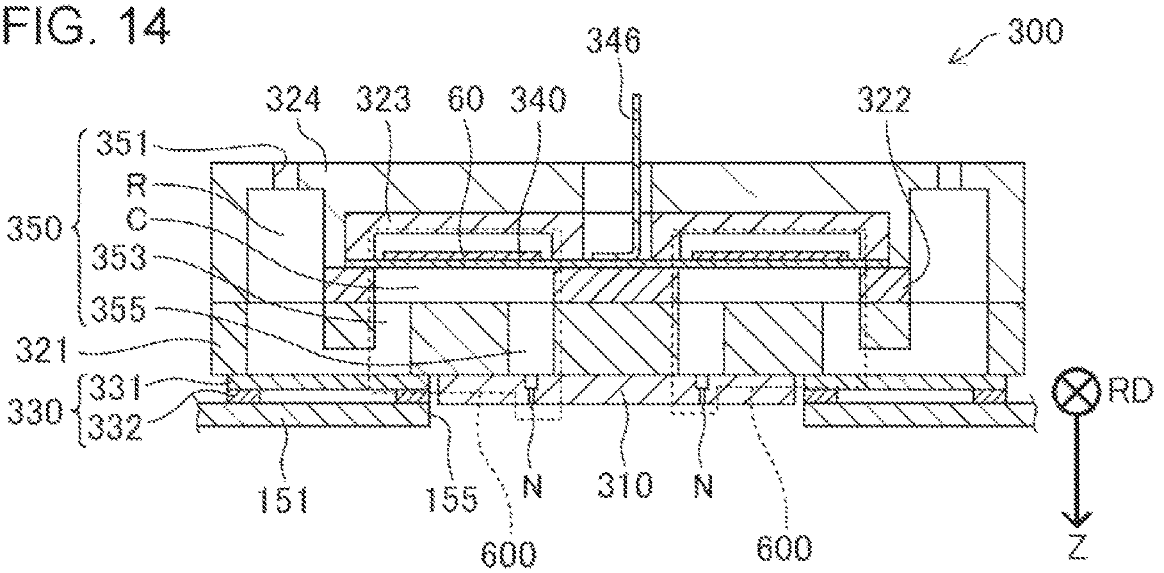
FIG. 14 is a cross-sectional view when a head chip is cut.

Next, an example of the structure of the head chip 300 will be described. FIG. 14 is a diagram showing a schematic structure of the head chip 300, and is a cross-sectional view when the head chip 300 is cut in a direction perpendicular to the row direction RD so as to include at least one nozzle N. As shown in FIG. 14, the head chip 300 has a nozzle plate 310 provided with a plurality of nozzles N that eject ink, a flow path forming substrate 321 that defines a communication flow path 355, an individual flow path 353, and a reservoir R, a pressure chamber substrate 322 that defines a pressure chamber C, a protective substrate 323, a compliance portion 330, a diaphragm 340, a piezoelectric element 60, a flexible wiring substrate 346, and a case 324 that defines the reservoir R and the liquid introduction port 351. Ink is supplied to the head chip 300 from a liquid discharge port (not shown) provided in the holder 140 via the liquid introduction port 351. The ink supplied to the head chip 300 reaches the nozzle N via the ink flow path 350 configured including the reservoir R, the individual flow path 353, the pressure chamber C, and the communication flow path 355, and the piezoelectric element 60 is driven to eject the ink from the nozzle N. Here, a configuration including the piezoelectric element 60, the diaphragm 340, the nozzle N, the individual flow path 353, the pressure chamber C, and the communication flow path 355 to eject ink may be referred to as the ejection portion 600.

The structure of the head chip 300 will be specifically described. The ink flow path 350 is configured by laminating a flow path forming substrate 321, a pressure chamber substrate 322, and a case 324 along the Z direction. The ink introduced into the case 324 from the liquid introduction port 351 is stored in the reservoir R. The reservoir R is a common flow path communicating with a plurality of individual flow paths 353 corresponding to each of the plurality of nozzles N constituting the nozzle row.

The ink stored in the reservoir R is supplied to the pressure chamber C via the individual flow path 353. In the pressure chamber C, by applying pressure to the stored ink, the ink is ejected from the nozzle N via the communication flow path 355. The diaphragm 340 is located on the −Z side of the pressure chamber C so as to seal the pressure chamber C, and the piezoelectric element 60 is located on the −Z side of the diaphragm 340.

The piezoelectric element 60 is constituted by a piezoelectric body and a pair of electrodes formed on both sides of the piezoelectric body. When the drive signal VOUT is supplied to one of the pair of electrodes included in the piezoelectric element 60 via the flexible wiring substrate 346 and the reference voltage signal VBS is supplied to the other of the pair of electrodes included in the piezoelectric element 60 via the flexible wiring substrate 346, the piezoelectric body is displaced by the potential difference generated between the pair of electrodes, and as a result, the piezoelectric element 60 including the piezoelectric body is driven. As the piezoelectric element 60 is driven, the diaphragm 340 provided with the piezoelectric element 60 is deformed, and as a result, the internal pressure of the pressure chamber C changes. Then, as the internal pressure of the pressure chamber C changes, the ink stored in the pressure chamber C is ejected from the nozzle N via the communication flow path 355.

Further, the nozzle plate 310 and the compliance portion 330 are fixed to the +Z side of the flow path forming substrate 321. The nozzle plate 310 is located on the +Z side of the communication flow path 355. A plurality of nozzles N are arranged side by side on the nozzle plate 310 along the row direction RD. The compliance portion 330 is located on the +Z side of the reservoir R and the individual flow path 353, and includes a sealing film 331 and a support 332. The sealing film 331 is a flexible film-like member, and seals the +Z side of the reservoir R and the individual flow path 353. The outer peripheral edge of the sealing film 331 is supported by a frame-shaped support 332. Further, the +Z side of the support 332 is fixed to the flat surface portion 151 of the fixing plate 150. The compliance portion 330 configured as described above protects the head chip 300 and reduces ink pressure fluctuations inside the reservoir R and inside the individual flow path 353.

Referring back to FIG. 13, as described above, the ejection head 100 distributes the ink supplied from the liquid container 5 to the plurality of nozzles N, and ejects the ink from the nozzle N by driving the piezoelectric element 60 generated based on the drive signal VOUT supplied via the flexible wiring substrate 346. Here, the drive signal selection circuit 200 may be provided on the wiring substrate 130, or may be provided on the flexible wiring substrate 346 corresponding to each of the head chips 300.

Referring back to FIGS. 10 and 11, the ejection control portion G4 is located on the −Z side of the flow path structure G1 and includes a wiring substrate 420. The wiring substrate 420 includes a surface 422 and a surface 421 located on the opposite side of the surface 422 and facing the surface 422. The wiring substrate 420 is arranged so that the surface 422 faces the side of the flow path structure G1, the supply control portion G2, and the liquid ejection portion G3, and the surface 421 faces the side opposite to the flow path structure G1, the supply control portion G2, and the liquid ejection portion G3.

A semiconductor device 423 is provided in the region on the −X side of the surface 421 of the wiring substrate 420. The semiconductor device 423 is a circuit component that constitutes at least a portion of the head control circuit 21, and includes, for example, a SoC. That is, the image information signal IP input from the control unit 10 to the head unit 20 is input to the semiconductor device 423. The semiconductor device 423 generates various signals based on the input image information signal IP, outputs corresponding control signals to various configurations included in the head unit 20, and also outputs basic drive data dA and dB to the drive signal output unit 50.

Further, a connector 424 is provided along the end side of the wiring substrate 420 located on the −Y side, which is a region on the +X side of the surface 421 of the wiring substrate 420 with respect to the semiconductor device 423. The connector 424 is electrically coupled to the drive signal output unit 50. Accordingly, the basic drive data dA and dB output by the semiconductor device 423 are supplied to the drive signal output unit 50, and the drive signals COMA and COMB output by the drive signal output unit 50 are propagated to the ejection portion 600 included in the ejection head 100.

Here, the wiring substrate 420 is a so-called rigid substrate in which a copper foil portion is protected by a solder resist or the like after a wiring pattern is formed on a base material such as a hard composite member or a glass epoxy resin, for example, by a copper foil or the like. The wiring substrate 420 is an example of a first rigid substrate, and the connector 424 provided on the wiring substrate 420 is an example of a first connector.

The head unit 20 configured as described above has the ejection portion 600 including the piezoelectric element 60 and ejecting ink, the wiring substrate 420 that propagates the drive signals COMA and COMB to the ejection portion 600, and the connector 424 to which the drive signals COMA and COMB are input. Then, the head unit 20 includes the piezoelectric element 60 that is driven with supply of the drive signals COMA and COMB from the drive signal output unit 50, and ejects ink as a liquid by driving the piezoelectric element 60.

Next, the configuration of the drive signal output unit 50 will be described. As shown in FIGS. 10 and 11, the drive signal output unit 50 is located on the −Z side of the ejection control portion G4 and includes a wiring substrate 501. The wiring substrate 501 includes a surface 512 and a surface 511 located on the opposite side of the surface 512 and facing the surface 512. The wiring substrate 501 is arranged so that the surface 512 faces the ejection control portion G4 side and the surface 511 faces the side opposite to the ejection control portion G4. That is, the shortest distance between the surface 421 and the surface 512 is shorter than the shortest distance between the surface 422 and the surface 512, and the shortest distance between the surface 512 and the surface 421 is shorter than the shortest distance between the surface 511 and the surface 421. In other words, the surface 421 of the wiring substrate 420 and the surface 512 of the wiring substrate 501 are located facing each other.

The drive circuits 51*a* and 51*b* that output the drive signals COMA and COMB are provided on the surface 511 of the wiring substrate 501. Specifically, the surface 511 is provided with the integrated circuit 500, the transistors M1 and M2, the coils L1, and the capacitor C1 included in the drive circuit 51*a*, which are class D amplifier circuits of the drive circuit 51*a*, and the integrated circuit 500, the transistors M1 and M2, the coils L1, and the capacitor C1 included in the drive circuit 51*b*, which are class D amplifier circuits of the drive circuit 51*b*.

Further, a connector 513 is provided on the surface 512 of the wiring substrate 501. The connector 513 inputs the basic drive data dA and dB, which are the basis of the drive signals COMA and COMB generated by the drive circuits 51*a* and 51*b* to the drive signal output unit 50, and outputs the drive signals COMA and COMB output by the drive circuits 51*a* and 51*b* to the head unit 20.

As described above, the drive signal output unit 50 outputs the drive signals COMA and COMB. Specifically, the drive signal output unit 50 has the wiring substrate 501, the connector 513 that outputs the drive signals, the drive circuit 51*a* including the DAC 510 that converts the basic drive data dA that is a digital signal into the basic drive signal aA that is an analog signal, and the output circuit 550 that amplifies the basic drive signal aA and outputs the drive signal COMA, and the drive circuit 51*b* including the DAC 510 that converts the basic drive data dB that is a digital signal into the basic drive signal aB that is an analog signal, and the output circuit 550 that amplifies the basic drive signal aB and outputs the drive signal COMB, and outputs the drive signals COMA and COMB to the head unit 20.

Here, the wiring substrate 501 is a so-called rigid substrate in which a copper foil portion is protected by a solder resist or the like after a wiring pattern is formed on a base material such as a hard composite member or a glass epoxy resin, for example, by a copper foil or the like. The wiring substrate 501 is an example of a second rigid substrate, and the connector 513 provided on the wiring substrate 501 is an example of a second connector.

As described above, in the present embodiment, the drive signal output unit 50 is located on the −Z side of the head unit 20 which is opposite to the +Z side on which the head unit 20 ejects ink. In other words, the head unit 20 includes the nozzle plate 310 on which the nozzle N for ejecting ink is formed, and the wiring substrate 420 and the wiring substrate 501 are provided so that the shortest distance between the surface 422 of the wiring substrate 420 and the +Z side surface on which ink is ejected from the nozzle N formed on the nozzle plate 310 is shorter than the shortest distance between the surface 421 and the +Z side surface on which ink is ejected from the nozzle N formed on the nozzle plate 310, and the shortest distance between the surface 422 and the wiring substrate 501 is shorter than the shortest distance between the surface 421 and the wiring substrate 501.

That is, the wiring substrate 501 on which the drive circuits 51*a* and 51*b* are mounted is arranged away from the nozzle N. Accordingly, even when some of the ink ejected from the nozzle N is turned to a mist and floats inside the liquid ejecting apparatus 1 as an ink mist, the drive circuits 51*a* and 51*b* are located away from the nozzle N. Therefore, the possibility that the ink mist adheres to the drive circuits 51*a* and 51*b* is reduced. As a result, the possibility that the ink mist affects the operation of the drive circuits 51*a* and 51*b* is reduced, and the operation of the drive circuits 51*a* and 51*b* is stabilized. Thus, the waveform accuracy of the drive signals COMA and COMB output by the drive circuits 51*a* and 51*b* is improved.

Further, in the drive signal output unit 50, the electronic components constituting the drive circuits 51*a* and 51*b* are mounted on the surface 511 of the wiring substrate 501. In other words, the electronic components constituting the drive circuits 51*a* and 51*b* are not mounted on the surface 512 of the wiring substrate 501 located opposite to the surface 421 of the wiring substrate 420. That is, no electronic components other than the connector 513 are provided on the surface 512 of the wiring substrate 501 located facing the surface 421 of the wiring substrate 420.

Accordingly, even when the drive circuits 51*a* and 51*b* can be arranged further away from the nozzle N, and some of the ink ejected from the nozzle N is turned to a mist and floats inside the liquid ejecting apparatus 1, the possibility that the ink mist adheres to the drive circuits 51*a* and 51*b* is further reduced. Therefore, the possibility that the ink mist affects the operation of the drive circuits 51*a* and 51*b* is further reduced, the operation of the drive circuits 51*a* and 51*b* is further stabilized, and the waveform accuracy of the drive signals COMA and COMB output by the drive circuits 51*a* and 51*b* is further improved.

Further, since the drive circuits 51*a* and 51*b* supply the drive signals COMA and COMB to the plurality of nozzles N included in the head unit 20, heat generation becomes large. By not providing the drive circuits 51*a* and 51*b*, which may generate a large amount of heat, on the surface 512 of the wiring substrate 501 located facing the surface 421 of the wiring substrate 420, the possibility of heat generated in the drive circuits 51*a* and 51*b* staying between the surface 421 of the wiring substrate 420 and the surface 512 of the wiring substrate 501 is reduced, and the heat dissipation efficiency of the drive circuits 51*a* and 51*b* can be improved. In addition, the drive circuits 51*a* and 51*b*, which may generate a large amount of heat, can be arranged away from the ejection head 100 in which ink is stored, and as a result, the possibility that the heat generated in the drive circuits 51*a* and 51*b* is propagated to the ink is reduced. Therefore, the possibility that the physical properties of the ink will change due to heat is reduced, and as a result, the ejection accuracy of the ink ejected from the head unit 20 is improved.

Figure 15:
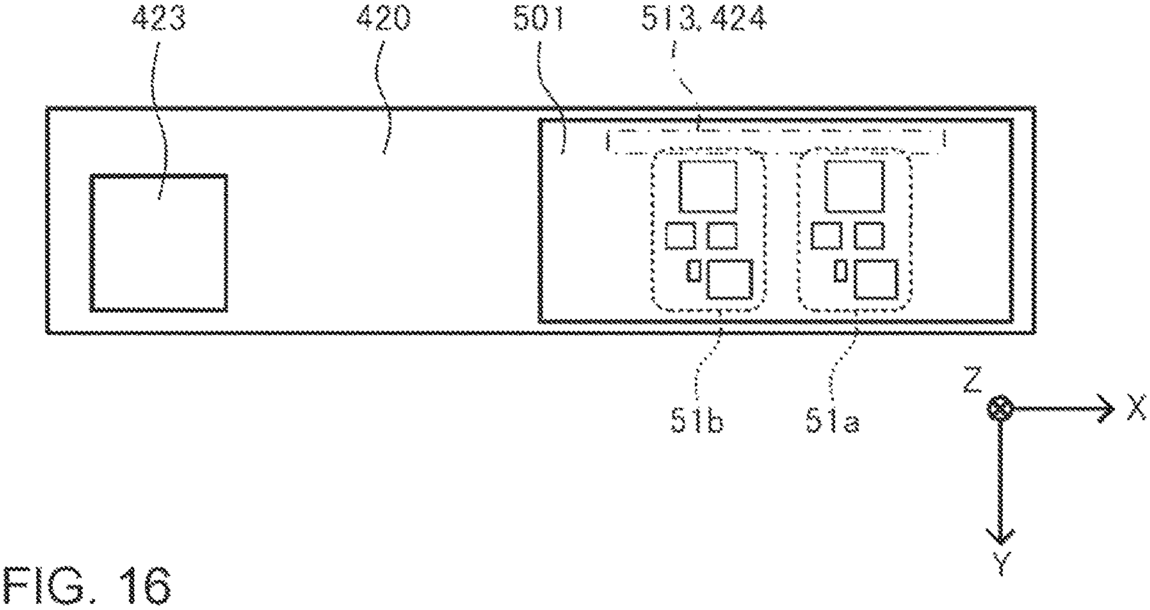
FIG. 15 is a plan view of the head unit and the drive signal output unit shown in FIGS. 10 and 11 when viewed from the +Z side.
Figure 16:
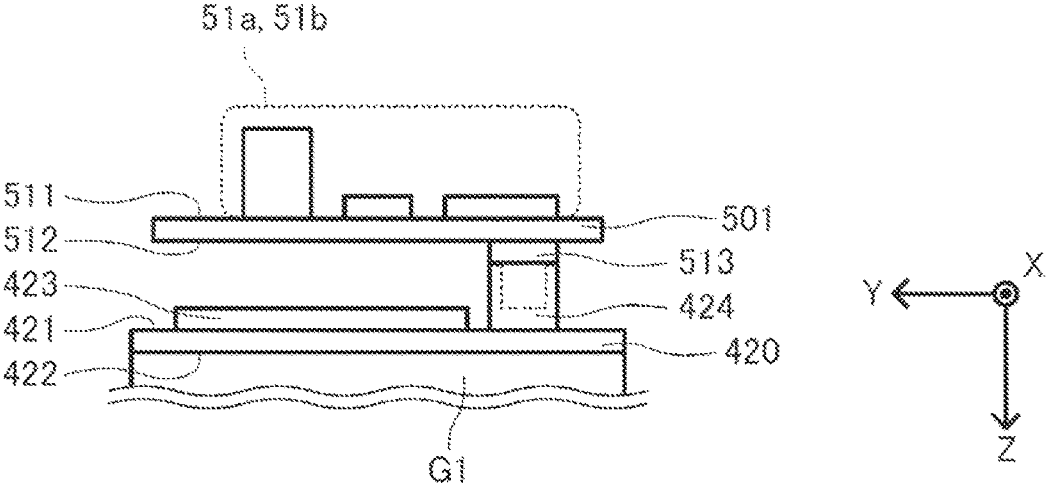
FIG. 16 is a side view of a wiring substrate included in the head unit and a wiring substrate included in the drive signal output unit shown in FIGS. 10 and 11 when viewed from the −X side.

Next, the arrangement of the wiring substrate 420 included in the head unit 20 and the wiring substrate 501 included in the drive signal output unit 50, and the details of the electrical coupling will be described. FIG. 15 is a plan view of the head unit 20 and the drive signal output unit 50 shown in FIGS. 10 and 11 when viewed from the +Z side. FIG. 16 is a side view of the wiring substrate 420 included in the head unit 20 and the wiring substrate 501 included in the drive signal output unit 50 shown in FIGS. 10 and 11 when viewed from the −X side.

As shown in FIGS. 15 and 16, in the liquid ejecting apparatus 1 according to the present embodiment, the wiring substrate 420 included in the head unit 20 and the wiring substrate 501 included in the drive signal output unit 50 are electrically coupled by fitting the connector 424 located on the surface 421 of the wiring substrate 420 and the connector 513 located on the surface 512 of the wiring substrate 501 in a state where the surface 421 of the wiring substrate 420 and the surface 512 of the wiring substrate 501 face each other. In other words, the wiring substrate 420 and the wiring substrate 501 are stacked and coupled by fitting the connector 424 and the connector 513 so that the terminal included in the connector 424 and the terminal included in the connector 513 are in direct contact with each other. That is, the connector 424 and the connector 513 in the present embodiment are board to board (BtoB) connectors, respectively, and when the wiring substrate 420 the wiring substrate 501 are stacked and coupled by the BtoB connectors, the basic drive data dA and dB and the drive signals COMA and COMB are propagated between the wiring substrate 420 and the wiring substrate 501.

Here, as shown in FIG. 15, when the head unit 20 and the drive signal output unit 50 are viewed in a plan view from the +Z side to the −Z side along the Z direction in which ink is ejected from the ejection portion 600, the wiring substrate 501 included in the drive signal output unit 50 is located so as to overlap the wiring substrate 420 included in the head unit 20. Accordingly, even when some of the ink ejected from the nozzle N is turned to a mist, and the ink mist floats inside the liquid ejecting apparatus 1, the wiring substrate 420 included in the head unit 20 functions as a protection member for reducing the possibility that the ink mist adheres to the drive circuits 51*a* and 51*b*. Therefore, the possibility that the ink mist adheres to the drive circuits 51*a* and 51*b* is further reduced, as a result, the possibility that the ink mist affects the operation of the drive circuits 51*a* and 51*b* is further reduced, the operation of the drive circuits 51*a* and 51*b* is further stabilized, and the waveform accuracy of the drive signals COMA and COMB output by the drive circuits 51*a* and 51*b* is further improved.

Therefore, when the head unit 20 and the drive signal output unit 50 are viewed in a plan view from the +Z side to the −Z side along the Z direction in which ink is ejected from the ejection portion 600, at least a portion of the wiring substrate 501 included in the drive signal output unit 50 may be located so as to overlap the wiring substrate 420 included in the head unit 20, and as shown in FIG. 15, when the head unit 20 and the drive signal output unit 50 are viewed in a plan view from the +Z side to the −Z side along the Z direction in which ink is ejected from the ejection portion 600, it is more preferable that the entire wiring substrate 501 of the drive signal output unit 50 is located so as to overlap the wiring substrate 420 of the head unit 20. Accordingly, the possibility that the ink mist affects the operation of the drive circuits 51*a* and 51*b* can be further reduced, the operation of the drive circuits 51*a* and 51*b* can be further stabilized, and the waveform accuracy of the drive signals COMA and COMB output by the drive circuits 51*a* and 51*b* can be further improved.

Here, a specific example of the connectors 424 and 513 that electrically couple the wiring substrate 420 included in the head unit 20 and the wiring substrate 501 included in the drive signal output unit 50 will be described.

Figures 17A, 17B, 17C:
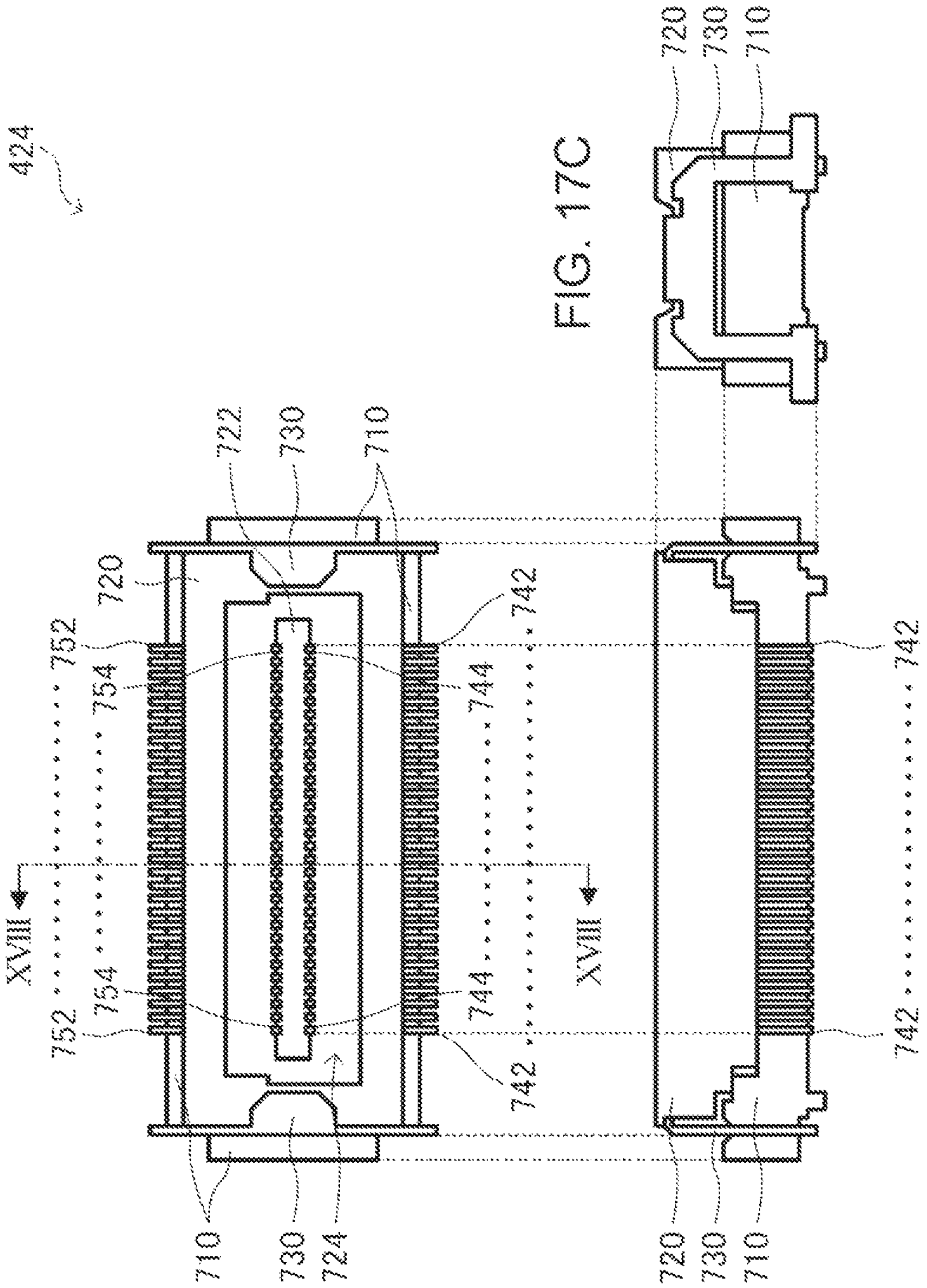
FIGS. 17A to 17C are diagrams showing the structure of a connector.
Figure 18:
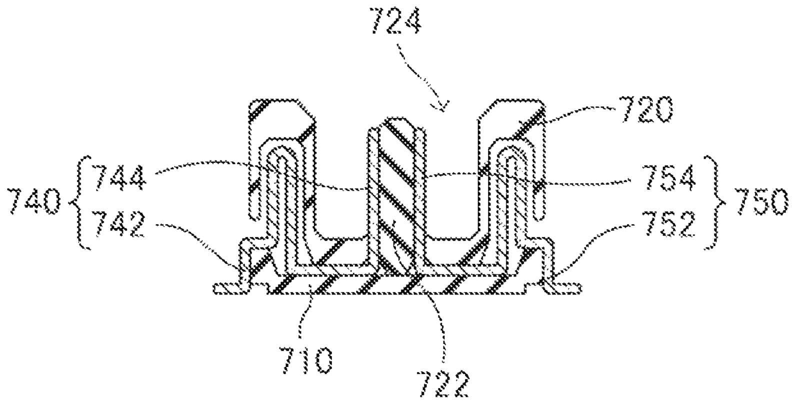
FIG. 18 is a cross-sectional view taken along line XVIII-XVIII shown in FIGS. 17A to 17C.

FIGS. 17A to 17C are diagrams showing the structure of the connector 424. Further, FIG. 18 is a cross-sectional view taken along line XVIII-XVIII shown in FIGS. 17A to 17C. As shown in FIGS. 17A to 18, the connector 424 in the first embodiment has a straight type receptacle shape, and includes insulators 710 and 720, fixing portions 730, a plurality of substrate connection terminals 742, a plurality of substrate connection terminals 752, a plurality of contact terminals 744, and a plurality of contact terminals 754. Here, in FIGS. 17A to 17C, as FIG. 17A, when the plurality of substrate connection terminals 742 and the plurality of substrate connection terminals 752 of the connector 424 are coupled to the wiring substrate 420, the case where the connector 424 is viewed from the normal direction of the wiring substrate 420 is shown, as FIG. 17B, the case where the connector 424 is orthogonal to the normal direction of the wiring substrate 420 and the connector 424 is viewed from the longitudinal direction is shown, and as FIG. 17C, the case where the connector 424 is orthogonal to the normal direction of the wiring substrate 420 and the connector 424 is viewed from the lateral direction is shown.

The insulators 710 and 720 function as an insulating member that insulates between the plurality of substrate connection terminals 742, between the plurality of substrate connection terminals 752, between the plurality of contact terminals 744, and between the plurality of contact terminals 754. Further, the insulator 720 is formed with a protrusion 722 and a plug mounting portion 724. The plug mounting portion 724 has an opening on the surface of the connector 424 facing the plurality of substrate connection terminals 742 and the plurality of substrate connection terminals 752 and is a substantially rectangular parallelepiped-shaped insertion hole formed along the longitudinal direction of the connector 424, and the connector 513 to be described later is inserted into the plug mounting portion 724. The protrusion 722 is a substantially rectangular parallelepiped-shaped protrusion formed inside the plug mounting portion 724 along the longitudinal direction of the connector 424, and functions as a guide for guiding the connector 513 inserted into the plug mounting portion 724 into a predetermined position. At least one of such insulators 710 and 720 are made of a liquid crystal polymer (LCP) containing glass fiber. In other words, the insulators 710 and 720 contain glass fiber.

The liquid ejecting apparatus 1 ejects a liquid on a fiber material including a cloth such as paper or clothing and a wide variety of media such as metal and plastic to form a desired image on the medium. Therefore, the types of inks vary depending on the type of medium used, such as water-based inks such as dye-based inks and pigment-based inks, UV-curable inks that are cured by irradiation with ultraviolet rays, and oil-based inks. In particular, in recent years, the development of semiconductor manufacturing technology using ink jet technology has progressed, the technical field in which the liquid ejecting apparatus 1 is used has become wider, and as a result, the types of liquids that can be used in the liquid ejecting apparatus 1 have increased.

In the liquid ejecting apparatus 1 in which such a wide variety of liquids can be used, the connector 424 is required to have high corrosion resistance because the physical properties differ depending on the type of ink used. In particular, the insulators 710 and 720 that ensure the insulation performance between the terminals that propagate the signal are required to have high corrosion resistance from the viewpoint of reducing the possibility that the signal accuracy is lowered due to the deterioration of the insulation performance. In the insulators 710 and 720 which are required to have such high corrosion resistance, by including glass fiber in the material, compared with the case where the insulators 710 and 720 are made of only polyethylene terephthalate (PET) resin or polypropylene (PP) resin, high corrosion resistance can be realized, and as a result, the possibility of the deterioration of the insulation performance of the connector 424 is reduced, and the possibility of the deterioration of the accuracy of the signal propagated through the connector 424 is also reduced. That is, since the insulators 710 and 720 contain glass fiber, it is possible to reduce the possibility that the reliability of the connector 424 is lowered even in the liquid ejecting apparatus 1 in which a wide variety of inks are used.

Further, it is preferable that no adhesive is used for the insulators 710 and 720. Here, the adhesive is a structure that adheres the members constituting the insulators 710 and 720 by using a chemical reaction. When an adhesive is used for the insulators 710 and 720, the ink used in the liquid ejecting apparatus 1 and the adhesive may cause a chemical reaction, and as a result, the adhesive effect of the adhesive may be impaired. In response to such problems, since the insulators 710 and 720 are assembled without using an adhesive, for example, by caulking or fitting, a chemical reaction occurs between the ink and the adhesive, and as a result, the possibility that an abnormality occurs in the connector 424 is reduced. Here, it is sufficient that no adhesive is used for the insulators 710 and 720, and of course, the insulators 710 and 720 may be composed of one molded product.

Here, at least one of the insulators 710 and 720 included in the connector 424 is an example of a first insulator portion.

The plurality of substrate connection terminals 742 are arranged side by side along one side of the connector 424 located in the longitudinal direction. The plurality of substrate connection terminals 742 are electrically coupled to the wiring substrate 420 by solder or the like. Further, the plurality of substrate connection terminals 752 are arranged side by side along the other side of the connector 424 located in the longitudinal direction. The plurality of substrate connection terminals 752 are electrically coupled to the wiring substrate 420 by solder or the like. The plurality of contact terminals 744 are arranged side by side along the longitudinal direction of the connector 424 on the surface of the substantially rectangular parallelepiped-shaped protrusion 722 formed along the longitudinal direction of the connector 424 on the side of the plurality of substrate connection terminals 742. Further, the plurality of contact terminals 754 are arranged side by side along the longitudinal direction of the connector 424 on the surface of the substantially rectangular parallelepiped-shaped protrusion 722 formed along the longitudinal direction of the connector 424 on the side of the plurality of substrate connection terminals 752.

As shown in FIG. 18, the plurality of substrate connection terminals 742 and the plurality of contact terminals 744 are electrically coupled to each other inside the insulators 710 and 720 on a one-to-one basis, and the plurality of substrate connection terminals 752 and the plurality of contact terminals 754 are electrically coupled to each other inside the insulators 710 and 720 on a one-to-one basis. Here, in the following description, the one-to-one corresponding substrate connection terminal 742 and contact terminal 744 may be collectively referred to as a connection terminal 740, and the one-to-one corresponding substrate connection terminal 752 and contact terminal 754 may be collectively referred to as a connection terminal 750. That is, the connector 424 includes a plurality of connection terminals 740 arranged side by side along one side located in the longitudinal direction, and a plurality of connection terminals 750 arranged side by side along the other side located in the longitudinal direction.

The plurality of connection terminals 740 and the plurality of connection terminals 750 included in such a connector 424 are each formed by plating a copper alloy with gold. As described above, since the connector 424 is used in the liquid ejecting apparatus 1 in which a wide variety of inks can be used, high corrosion resistance is required. If the plurality of connection terminals 740 and the plurality of connection terminals 750 are corroded, the impedances of the plurality of connection terminals 740 and the plurality of connection terminals 750 change, and as a result, the accuracy of the signal propagated through the plurality of connection terminals 740 and the plurality of connection terminals 750 is lowered. The ink ejection characteristics of the liquid ejecting apparatus 1 may deteriorate due to the deterioration of the accuracy of the signal propagated through the plurality of connection terminals 740 and the plurality of connection terminals 750. In response to such a problem, since each of the plurality of connection terminals 740 and the plurality of connection terminals 750 contains a copper alloy, it is possible to reduce the possibility that the plurality of connection terminals 740 and the plurality of connection terminals 750 are corroded by ink, and it is possible to reduce the possibility that the accuracy of the signal propagated through the connector 424 is lowered.

Further, it is preferable that the plurality of connection terminals 740 and the plurality of connection terminals 750 containing a copper alloy are plated with a metal having a small resistance value. The plurality of connection terminals 740 and the plurality of connection terminals 750 propagate the basic drive data dA and dB supplied to the drive signal output unit 50 and the drive signals COMA and COMB output by the drive signal output unit 50. By plating the plurality of connection terminals 740 and the plurality of connection terminals 750 with a metal having a small resistance value, the impedance of the signal propagation path can be reduced, and as a result, the signal accuracy of the basic drive data dA and dB and the drive signals COMA and COMB can be further improved.

Here, as the metal used for the plating treatment applied to the plurality of connection terminals 740 and the plurality of connection terminals 750 containing the copper alloy, it is preferable to use gold, silver, aluminum, or the like, and it is particularly preferable to perform the plating treatment using gold having a small resistivity. Accordingly, both high corrosion resistance and high conductivity can be realized.

Here, among the plurality of connection terminals 740 and the plurality of connection terminals 750, the terminal that propagates the drive signals COMA and COMB is an example of a first terminal.

The fixing portions 730 are located along each of the two short sides of the connector 424 facing each other in the longitudinal direction. The fixing portion 730 fixes the connector 424 to the wiring substrate 420 by fitting with the wiring substrate 420. In other words, the fixing portion 730 is fixed to the wiring substrate 420. Accordingly, even when an unintended stress is applied to the connector 424, the stress is absorbed by the fixing portion 730. Thus, the possibility that an unintended stress due to the stress is applied to the connection terminals 740 and 750 to which the basic drive data dA and dB and the drive signals COMA and COMB are propagated is reduced, and as a result, the possibility of problems such as pattern peeling occurring on the wiring substrate 420 to which the connection terminals 740 and 750 are coupled is reduced.

Each of such fixing portions 730 is formed by tin-plating a copper alloy. As described above, since the connector 424 is used in the liquid ejecting apparatus 1 in which a wide variety of inks can be used, high corrosion resistance is required. If the fixing portion 730 is corroded, problems such as pattern peeling as described above may occur, and as a result, signal accuracy may be lowered. With respect to such a problem, since the fixing portion 730 contains the copper alloy, it is possible to reduce the possibility that the fixing portion 730 is corroded by the ink.

Further, the fixing portion 730 has a configuration for fixing the connector 424 to the wiring substrate 420, and therefore is not a configuration used for propagating a signal other than a signal having a constant potential such as a ground potential. Therefore, it is preferable that the fixing portion 730 is plated with tin, which is hard to be deformed and is inexpensive. Accordingly, the strength of fixing to the wiring substrate 420 can be increased by the fixing portion 730. Further, the fixing portion 730 may be fixed to the wiring substrate 420 by soldering. In this case, since the fixing portion 730 is plated with tin, the joint strength between the fixing portion 730 and the wiring substrate 420 can be increased.

Here, the fixing portion 730 fixed to the wiring substrate 420 is an example of a first fixing portion.

Figures 19A, 19B, 19C:
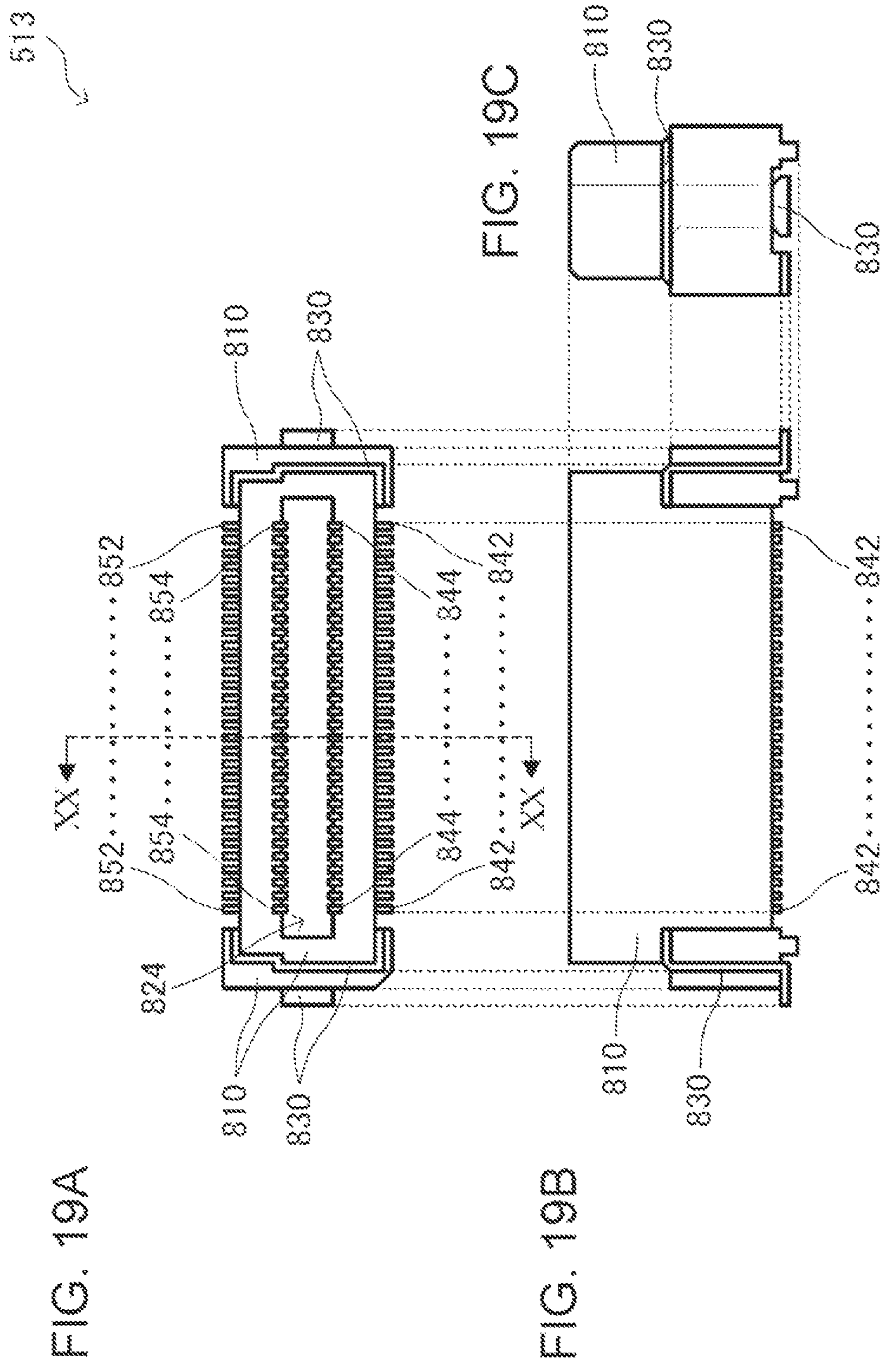
FIGS. 19A to 19C are diagrams showing the structure of a connector.
Figure 20:
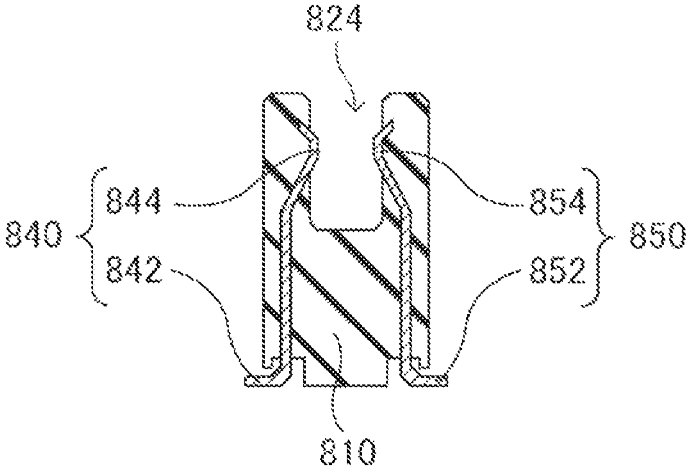
FIG. 20 is a cross-sectional view taken along line XX-XX shown in FIGS. 19A to 19C.

FIGS. 19A to 19C are diagrams showing the structure of the connector 513. Further, FIG. 20 is a cross-sectional view taken along line XX-XX shown in FIGS. 19A to 19C. As shown in FIGS. 19A to 20, the connector 513 in the first embodiment has a straight type plug shape, and includes an insulator 810, fixing portions 830, a plurality of substrate connection terminals 842, a plurality of substrate connection terminals 852, a plurality of contact terminals 844, and a plurality of contact terminals 854. Here, in FIGS. 19A to 19C, as FIG. 19A, when the plurality of substrate connection terminals 842 and the plurality of substrate connection terminals 852 of the connector 513 are coupled to the wiring substrate 501, the case where the connector 513 is viewed from the normal direction of the wiring substrate 501 is shown, as FIG. 19B, the case where the connector 513 is orthogonal to the normal direction of the wiring substrate 501 and the connector 513 is viewed from the longitudinal direction is shown, and as FIG. 19C, the case where the connector 513 is orthogonal to the normal direction of the wiring substrate 501 and the connector 513 is viewed from the lateral direction is shown.

The insulator 810 functions as an insulating member that insulates between the plurality of substrate connection terminals 842, between the plurality of substrate connection terminals 852, between the plurality of contact terminals 844, and between the plurality of contact terminals 854. Further, the insulator 810 is formed with a receptacle mounting portion 824. The receptacle mounting portion 824 has an opening on the surface of the connector 513 facing the plurality of substrate connection terminals 842 and the plurality of substrate connection terminals 852 and is a substantially rectangular parallelepiped-shaped insertion hole formed along the longitudinal direction of the connector 513, and the protrusion 722 included in the connector 424 described above is inserted into the receptacle mounting portion 824. Such an insulator 810 is made of a liquid crystal polymer (LCP) containing glass fiber. In other words, the insulator 810 contains glass fiber.

Similar to the connector 424, in the liquid ejecting apparatus 1 in which a wide variety of liquids can be used, the insulator 810 that ensures the insulation performance between the terminals that propagate the signal are required to have high corrosion resistance from the viewpoint of reducing the possibility that the signal accuracy is lowered due to the deterioration of the insulation performance. In the insulator 810 which is required to have such high corrosion resistance, by including glass fiber in the material, compared with the case where the insulator 810 is made of only PET resin or PP resin, high corrosion resistance can be realized, and as a result, the possibility of the deterioration of the insulation performance of the connector 513 is reduced, and the possibility of the deterioration of the accuracy of the signal propagated through the connector 513 is also reduced. That is, since the insulator 810 contains glass fiber, it is possible to reduce the possibility that the reliability of the connector 513 is lowered even in the liquid ejecting apparatus 1 in which a wide variety of inks are used.

Further, it is preferable that no adhesive is used for the insulator 810. Here, the adhesive is a structure that adheres the member constituting the insulator 810 by using a chemical reaction. When an adhesive is used for the insulator 810, the ink used in the liquid ejecting apparatus 1 and the adhesive may cause a chemical reaction, and as a result, the adhesive effect of the adhesive may be impaired. In response to such problems, since the insulator 810 is assembled without using an adhesive, for example, by caulking or fitting, a chemical reaction occurs between the ink and the adhesive, and as a result, the possibility that an abnormality occurs in the connector 513 is reduced. Here, it is sufficient that no adhesive is used for the insulator 810, and of course, the insulator 810 may be composed of one molded product.

Here, the insulator 810 included in the connector 513 is an example of a second insulator portion.

The plurality of substrate connection terminals 842 are arranged side by side along one side of the connector 513 located in the longitudinal direction. The plurality of substrate connection terminals 842 are electrically coupled to the wiring substrate 501 by solder or the like. Further, the plurality of substrate connection terminals 852 are arranged side by side along the other side of the connector 513 located in the longitudinal direction. The plurality of substrate connection terminals 852 are electrically coupled to the wiring substrate 501 by solder or the like. The plurality of contact terminals 844 are arranged side by side along the longitudinal direction of the connector 513 on the surface of the substantially rectangular parallelepiped-shaped receptacle mounting portion 824 formed along the longitudinal direction of the connector 513 on the side of the plurality of substrate connection terminals 842. Further, the plurality of contact terminals 854 are arranged side by side along the longitudinal direction of the connector 513 on the surface of the substantially rectangular parallelepiped-shaped receptacle mounting portion 824 formed along the longitudinal direction of the connector 513 on the side of the plurality of substrate connection terminals 852.

As shown in FIG. 20, the plurality of substrate connection terminals 842 and the plurality of contact terminals 844 are electrically coupled to each other inside the insulator 810 on a one-to-one basis, and the plurality of substrate connection terminals 852 and the plurality of contact terminals 854 are electrically coupled to each other inside the insulator 810 on a one-to-one basis. Here, in the following description, the one-to-one corresponding substrate connection terminal 842 and contact terminal 844 may be collectively referred to as a connection terminal 840, and the one-to-one corresponding substrate connection terminal 852 and contact terminal 854 may be collectively referred to as a connection terminal 850. That is, the connector 513 includes a plurality of connection terminals 840 arranged side by side along one side located in the longitudinal direction, and a plurality of connection terminals 850 arranged side by side along the other side located in the longitudinal direction.

The plurality of connection terminals 840 and the plurality of connection terminals 850 included in such a connector 513 are each formed by plating a copper alloy with gold. As described above, since the connector 513 is used in the liquid ejecting apparatus 1 in which a wide variety of inks can be used, high corrosion resistance is required. If the plurality of connection terminals 840 and the plurality of connection terminals 850 are corroded, the impedances of the plurality of connection terminals 840 and the plurality of connection terminals 850 change, and as a result, the accuracy of the signal propagated through the plurality of connection terminals 840 and the plurality of connection terminals 850 is lowered. The ink ejection characteristics of the liquid ejecting apparatus 1 may deteriorate due to the deterioration of the accuracy of the signal propagated through the plurality of connection terminals 840 and the plurality of connection terminals 850. In response to such a problem, since each of the plurality of connection terminals 840 and the plurality of connection terminals 850 contains a copper alloy, it is possible to reduce the possibility that the plurality of connection terminals 840 and the plurality of connection terminals 850 are corroded by ink, and it is possible to reduce the possibility that the accuracy of the signal propagated through the connector 513 is lowered.

Further, it is preferable that the plurality of connection terminals 840 and the plurality of connection terminals 850 containing a copper alloy are plated with a metal having a small resistance value. The plurality of connection terminals 840 and the plurality of connection terminals 850 propagate the basic drive data dA and dB supplied to the drive signal output unit 50 and the drive signals COMA and COMB output by the drive signal output unit 50. By plating the plurality of connection terminals 840 and the plurality of connection terminals 850 with a metal having a small resistance value, the impedance of the signal propagation path can be reduced, and as a result, the signal accuracy of the basic drive data dA and dB and the drive signals COMA and COMB can be further improved.

Here, as the metal used for the plating treatment applied to the plurality of connection terminals 840 and the plurality of connection terminals 850 containing the copper alloy, it is preferable to use gold, silver, aluminum, or the like, and it is particularly preferable to perform the plating treatment using gold having a small resistivity. Accordingly, both high corrosion resistance and high conductivity can be realized.

Here, among the plurality of connection terminals 840 and the plurality of connection terminals 850, the terminal that propagates the drive signals COMA and COMB is an example of a second terminal.

The fixing portions 830 are located along each of the two short sides of the connector 513 facing each other in the longitudinal direction. The fixing portion 830 fixes the connector 513 to the wiring substrate 501 by fitting with the wiring substrate 501. In other words, the fixing portion 830 is fixed to the wiring substrate 501. Accordingly, even when an unintended stress is applied to the connector 513, the stress is absorbed by the fixing portion 830. Thus, the possibility that an unintended stress due to the stress is applied to the connection terminals 840 and 850 to which the basic drive data dA and dB and the drive signals COMA and COMB are propagated is reduced, and as a result, the possibility of problems such as pattern peeling occurring on the wiring substrate 501 to which the connection terminals 840 and 850 are coupled is reduced.

Each of such fixing portions 830 is formed by tin-plating a copper alloy. As described above, since the connector 513 is used in the liquid ejecting apparatus 1 in which a wide variety of inks can be used, high corrosion resistance is required. If the fixing portion 830 is corroded, problems such as pattern peeling as described above may occur, and as a result, signal accuracy may be lowered. With respect to such a problem, since the fixing portion 830 contains the copper alloy, it is possible to reduce the possibility that the fixing portion 830 is corroded by the ink.

Further, the fixing portion 830 has a configuration for fixing the connector 513 to the wiring substrate 501, and therefore is not a configuration used for propagating a signal other than a signal having a constant potential such as a ground potential. Therefore, it is preferable that the fixing portion 830 is plated with tin, which is hard to be deformed and is inexpensive. Accordingly, the strength of fixing to the wiring substrate 501 can be increased by the fixing portion 830. Further, the fixing portion 830 may be fixed to the wiring substrate 501 by soldering. In this case, since the fixing portion 830 is plated with tin, the joint strength between the fixing portion 830 and the wiring substrate 501 can be increased.

Here, the fixing portion 830 fixed to the wiring substrate 501 is an example of a second fixing portion.

The connector 424 and the connector 513 configured as described above are fitted so that the connection terminal 740 and the connection terminal 840 are in direct contact with each other and the connection terminal 750 and the connection terminal 850 are in direct contact with each other, thereby electrically coupling the wiring substrate 420 and the wiring substrate 501.

Figure 21:
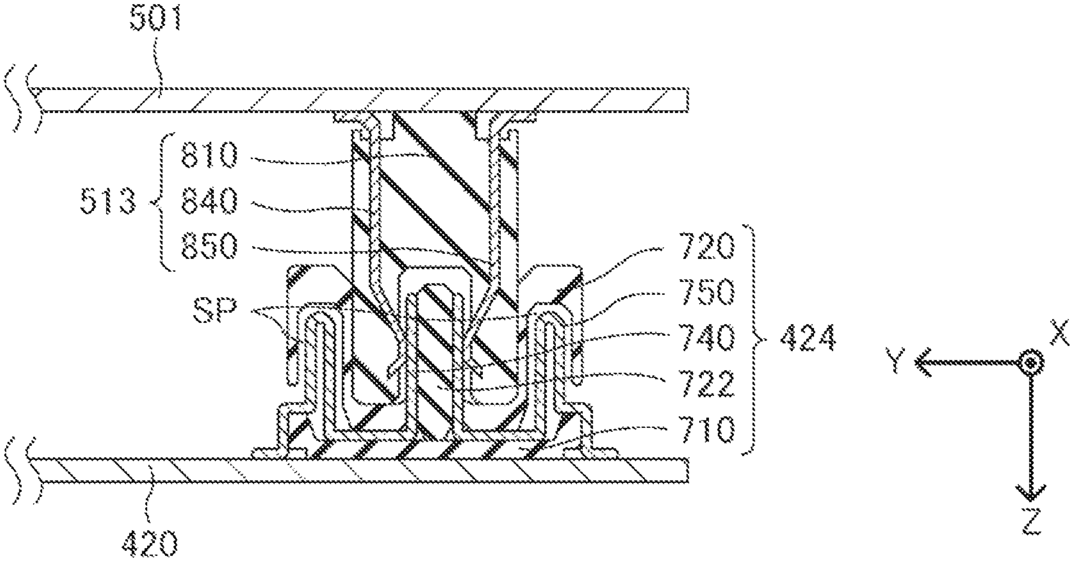
FIG. 21 is a diagram showing a state where the connector and the connector are fitted.

FIG. 21 is a diagram showing a state where the connector 424 and the connector 513 are fitted. As shown in FIG. 21, one end of the connection terminals 740 and 750 of the connector 424 is electrically coupled to the wiring substrate 420. Further, the insulator 810 of the connector 513 is inserted into the plug mounting portion 724 of the connector 424. Further, the protrusion 722 of the connector 424 is inserted into the receptacle mounting portion 824 of the connector 513. Accordingly, the connector 424 and the connector 513 are fitted.

In this case, the connection terminal 740 provided on the protrusion 722 of the connector 424 comes into contact with the connection terminal 840 provided on the receptacle mounting portion 824 of the connector 513, and the connection terminal 750 provided on the protrusion 722 of the connector 424 comes into contact with the connection terminal 850 provided on the receptacle mounting portion 824 of the connector 513. Accordingly, the wiring substrate 420 to which the connector 424 is fixed and the wiring substrate 501 to which the connector 513 is fixed are electrically coupled to each other, and the basic drive data dA and dB are supplied to the drive signal output unit 50 including the wiring substrate 501, and the drive signals COMA and COMB output by the drive signal output unit 50 are supplied to the head unit 20 including the wiring substrate 420.

The drive signals COMA and COMB shared by the head unit 20 are propagated through the wiring substrate 420 and then supplied to each of the ejection heads 100-1 to 100-6, and the drive signal selection circuit 200 selects or does not select the signal waveforms included in the drive signals COMA and COMB. As a result, the drive signal VOUT is generated and supplied to the piezoelectric element 60 of the ejection portion 600 included in the head chip 300.

Here, as shown in FIG. 21, an interference space SP is formed between the connection terminal 740 and the insulator 720 included in the connector 424 and between the connection terminal 750 and the insulator 720. The interference space SP forms a movable area in which the connection terminals 740 and 750 and the insulator 720 can move with respect to the insulator 710. Since the connector 424 has the movable area, even if there is a misalignment between the connector 424 and the connector 513 when the connector 424 and the connector 513 are fitted, the connector 424 and the connector 513 can be fitted so that the connection terminal 740 and the connection terminal 840 are in direct contact with each other and the connection terminal 750 and the connection terminal 850 are in direct contact with each other. That is, the connector 424 is configured as a floating connector that absorbs an error that occurs when the connector 424 and the connector 513 are fitted.

Here, although the connector 424 has been described as a floating connector in the present embodiment, the connector 513 may be a floating connector, and both the connector 424 and the connector 513 may be floating connectors.

In the present embodiment, although it has been described that the connector 424 has a straight type receptacle shape, and the connector 513 has a straight type plug shape, the connector 513 may have a straight type receptacle shape, and the connector 424 may have a straight type plug shape. That is, one of the connector 424 and the connector 513 has a receptacle shape, and the other of the connector 424 and the connector 513 has a plug shape.

6. Effect

As described above, in the liquid ejecting apparatus 1 according to the present embodiment, the head unit 20 that ejects ink based on the drive signals COMA and COMB and the drive signal output unit 50 that outputs the drive signals COMA and COMB to the head unit 20 are electrically coupled by a so-called BtoB connector in which the connector 424 and the connector 513 are fitted so that the terminal included in the connector 424 and the terminal included in the connector 513 are in direct contact with each other. The fixing portion 730 that fixes the connector 424 as the BtoB connector to the wiring substrate 420 is tin-plated. By protecting the fixing portion 730 from corrosion by this tin plating, the possibility that the fixing portion 730 is corroded due to the ink used in the liquid ejecting apparatus 1 adhering to the fixing portion 730 is reduced, and as a result, even in the liquid ejecting apparatus 1 in which a wide variety of inks are used, the reliability of fixing the connector 424 to the wiring substrate 420 is improved. As a result, the reliability of the electrical coupling between the drive signal output unit 50 and the head unit 20 is improved. Therefore, the possibility that the drive signals COMA and COMB will not be supplied to the head unit 20 due to the poor electrical coupling of the connector 424 is reduced.

Similarly, by tin-plating the fixing portion 830 that fixes the connector 513 as the BtoB connector to the wiring substrate 501, the possibility of corrosion of the fixing portion 830 due to the ink used in the liquid ejecting apparatus 1 adhering to the fixing portion 830 is reduced, and as a result, the reliability of fixing the connector 513 to the wiring substrate 501 is improved. As a result, the reliability of the electrical coupling between the drive signal output unit 50 and the head unit 20 is improved. Therefore, the possibility that the drive signals COMA and COMB will not be supplied to the head unit 20 due to the poor electrical coupling of the connector 513 is reduced.

In the liquid ejecting apparatus 1 according to the present embodiment, the wiring substrate 420 included in the head unit 20 and the wiring substrate 501 included in the drive signal output unit 50 are electrically coupled by the connectors 424 and 513 which are BtoB connectors. Accordingly, compared with the case where the wiring substrate 420 included in the head unit 20 and the wiring substrate 501 included in the drive signal output unit 50 are electrically coupled by a cable such as an FFC, the drive signal output unit 50 can be arranged in the vicinity of the head unit 20. Accordingly, the area occupied by the head unit 20 and the drive signal output unit 50 inside the liquid ejecting apparatus 1 can be reduced compared with the configuration in which the head unit 20 and the drive signal output unit 50 are electrically coupled using a cable such as an FFC and the drive signals COMA and COMB are supplied to the head unit 20. As a result, the size of the liquid ejecting apparatus 1 can be reduced.

Further, since both the wiring substrate 420 and the wiring substrate 501 are composed of a rigid substrate, when the wiring substrate 420 and the wiring substrate 501 are coupled by using the connector 424 and the connector 513, the possibility of deformation of the wiring substrates 420 and 501 is reduced. As a result, the possibility that the wiring impedance of the wiring substrates 420 and 501 fluctuates before and after coupling the wiring substrate 420 and the wiring substrate 501 by using the connector 424 and the connector 513 is reduced. That is, the possibility that the wiring impedance of the propagation path through which the drive signals COMA and COMB propagate fluctuates is reduced, and the possibility that waveform distortion due to the fluctuation of the wiring impedance occurs in the drive signals COMA and COMB is also reduced.

Further, when the wiring substrate 420 and the wiring substrate 501 are coupled by a cable such as an FFC, the wiring impedance of the propagation path through which the drive signals COMA and COMB propagate fluctuates depending on the deformation of the cable. However, in the liquid ejecting apparatus 1 according to the present embodiment, the head unit 20 and the drive signal output unit 50 are electrically coupled by a so-called BtoB connector in which the connector 424 and the connector 513 are fitted so that the terminal included in the connector 424 and the terminal included in the connector 513 are in direct contact with each other without using a cable such as an FFC. Therefore, there is no possibility that the wiring impedance fluctuates due to such a cable, and the possibility that waveform distortion due to the fluctuation of the wiring impedance occurs in the drive signals COMA and COMB is reduced.

As described above, in the liquid ejecting apparatus 1 according to the present embodiment, in addition to reducing the possibility of problems caused by the ink ejected by the liquid ejecting apparatus 1 to the connectors 424 and 513, the size of the liquid ejecting apparatus 1 can be reduced. In addition, high reliability of the liquid ejecting apparatus 1 can be ensured by reducing the possibility of waveform distortion occurring in the drive signals COMA and COMB for ejecting ink from the head unit 20.

Further, in the liquid ejecting apparatus 1 according to the present embodiment, the insulators 710 and 720 included in the connector 424 and the insulator 810 included in the connector 513 contain glass fiber, the plurality of connection terminals 740 and 750 included in the connector 424 and the plurality of connection terminals 840 and 850 included in the connector 513 contain a gold-plated copper alloy. Accordingly, even in the liquid ejecting apparatus 1 which is used in a wide range of fields and has a wide variety of liquids to be ejected, the possibility that the connectors 424 and 513 are corroded by the physical properties of the ejected liquid, and as a result, an abnormality occurs in the operation of the liquid ejecting apparatus 1 is reduced.

7. Modification Example

In the liquid ejecting apparatus 1 according to the present embodiment described above, the wiring substrate 501 included in the drive signal output unit 50 may be provided so as to be substantially perpendicular to the wiring substrate 420 included in the head unit 20.

Figure 22:
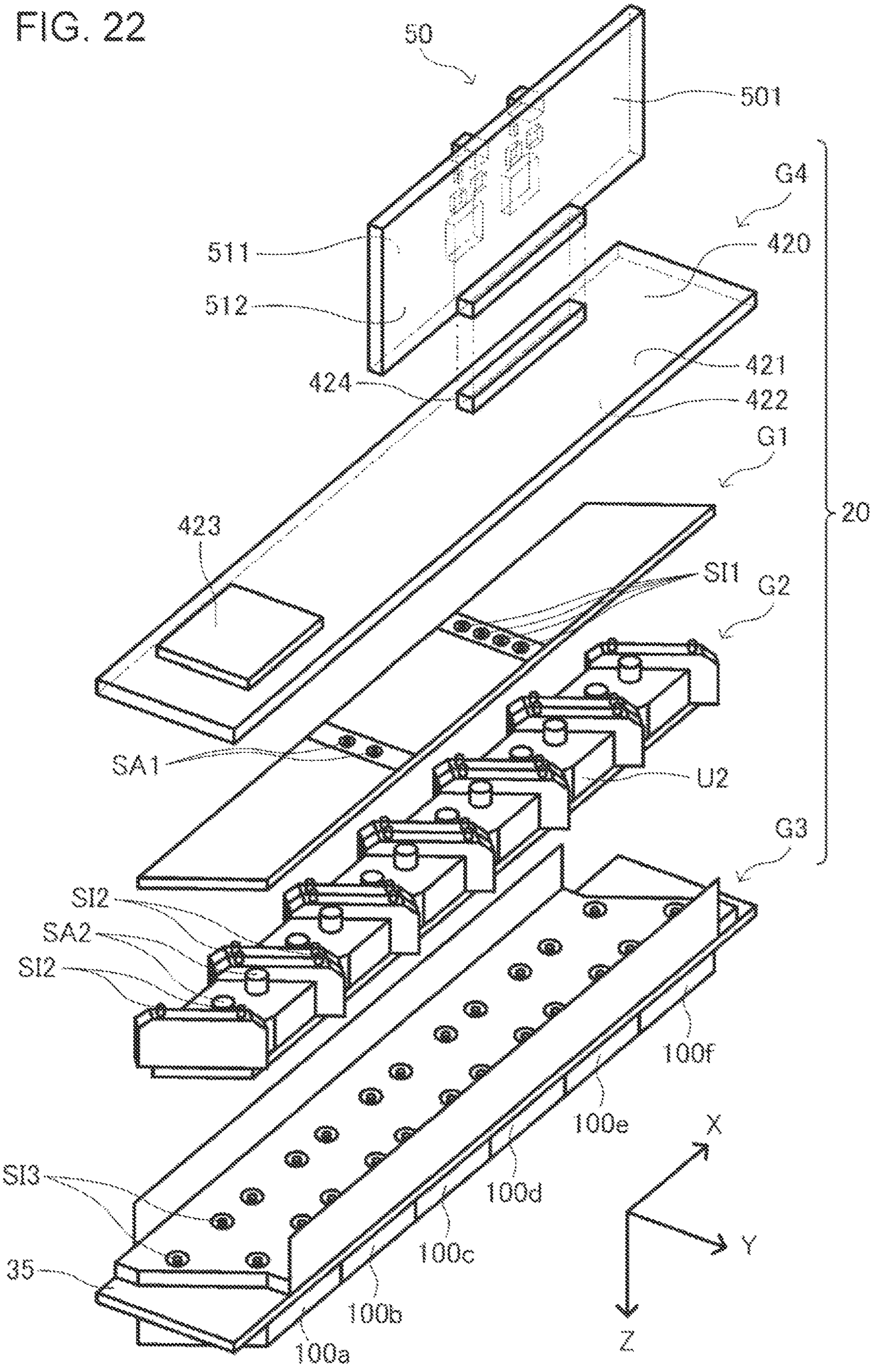
FIG. 22 is an exploded perspective view of the head unit and the drive signal output unit according to a modification example when viewed from the −Z side.

FIG. 22 is an exploded perspective view of the head unit 20 and the drive signal output unit 50 according to a modification example when viewed from the −Z side. As shown in FIG. 22, the wiring substrate 501 is perpendicularly coupled to the wiring substrate 420 by the connectors 424 and 513. Specifically, one of the connector 424 and the connector 513 may be of the right angle type.

In the case of the liquid ejecting apparatus 1 according to the modification example, the wiring substrate 501 is substantially perpendicularly coupled to the wiring substrate 420 by the connectors 424 and 513. Accordingly, the possibility of heat staying between the wiring substrate 501 and the wiring substrate 420 is reduced. As a result, the heat dissipation efficiency of the drive circuits 51*a* and 51*b* included in the drive signal output unit 50 is improved, and the possibility that the heat generated in the drive circuits 51*a* and 51*b* included in the drive signal output unit 50 affects the physical properties of the ink stored in the ejection head 100 is reduced.

The embodiments and modification examples have been described above, but the present disclosure is not limited to these embodiments and can be carried out in various modes without departing from the scope of the disclosure. For example, it is possible to combine the above-described embodiments as appropriate.

The present disclosure includes configurations that are substantially the same as the configurations described in the embodiments (for example, configurations having the same function, method, and result, or configurations having the same object and effect). Further, the present disclosure includes configurations in which non-essential parts of the configurations described in the embodiments are replaced. In addition, the present disclosure includes configurations that achieve the same effect as the configurations described in the embodiments or configurations that can achieve the same object. Further, the present disclosure includes configurations in which known techniques are added to the configurations described in the embodiment.

The following contents are derived from the above-described embodiment.

According to an aspect, there is provided a liquid ejecting apparatus including a head unit that includes a piezoelectric element that is driven with supply of a drive signal and ejects a liquid by driving the piezoelectric element, and a drive signal output unit that outputs the drive signal, in which the head unit includes an ejection portion that ejects the liquid, a first rigid substrate that propagates the drive signal to the ejection portion, and a first connector to which the drive signal is input, the drive signal output unit includes a second rigid substrate and a second connector from which the drive signal is output, the first connector includes a first fixing portion fixed to the first rigid substrate and a first terminal through which the drive signal propagates, the second connector includes a second fixing portion fixed to the second rigid substrate and a second terminal through which the drive signal propagates, one of the first connector and the second connector has a receptacle shape, the other of the first connector and the second connector has a plug shape, the first connector and the second connector are fitted so that the first terminal and the second terminal are in direct contact with each other, and at least one of the first fixing portion and the second fixing portion is tin-plated.

According to this liquid ejecting apparatus, by tin-plating at least one of the first fixing portion for fixing the first connector to the first rigid substrate and the second fixing portion for fixing the second connector to the second rigid substrate, even in a liquid ejecting apparatus in which a wide variety of liquids are used, the possibility that at least one of the first fixing portion and the second fixing portion is corroded by the liquid is reduced. As a result, the possibility that an abnormality occurs in the first connector and the second connector is reduced, and the reliability of the signal propagated through the first connector and the second connector fixed by the first fixing portion and the second fixing portion is improved.

In the liquid ejecting apparatus according to the aspect, at least one of the first fixing portion and the second fixing portion may contain a tin-plated copper alloy.

According to this liquid ejecting apparatus, even in a liquid ejecting apparatus in which a wide variety of liquids are used, the corrosion resistance of the first fixing portion and the second fixing portion is further improved by configuring at least one of the first fixing portion and the second fixing portion to contain a tin-plated copper alloy, and the reliability of the signal propagated through the first connector and the second connector fixed by the first fixing portion and the second fixing portion is improved.

In the liquid ejecting apparatus according to the aspect, at least one of the first terminal and the second terminal may contain a copper alloy.

According to this liquid ejecting apparatus, even in a liquid ejecting apparatus in which a wide variety of liquids are used, the corrosion resistance of the first terminal and the second terminal is improved by configuring at least one of the first terminal and the second terminal to contain a copper alloy, and the reliability of the signal propagated through the first terminal and the second terminal is improved.

In the liquid ejecting apparatus according to the aspect, at least one of the first terminal and the second terminal may be gold-plated.

According to this liquid ejecting apparatus, by plating at least one of the first terminal and the second terminal with gold having a small resistivity, the signal distortion caused by the impedance of the first terminal and the second terminal is reduced, and the reliability of the signal propagated through the first terminal and the second terminal is improved.

In the liquid ejecting apparatus according to the aspect, at least one of the first connector and the second connector may be a floating connector.

According to this liquid ejecting apparatus, since the error that occurs when the first connector and the second connector are fitted can be absorbed, the first connector and the second connector can be more easily coupled.

In the liquid ejecting apparatus according to the aspect, the first connector may include a first insulator portion, the second connector may include a second insulator portion, and at least one of the first insulator portion and the second insulator portion may contain glass fiber.

According to this liquid ejecting apparatus, even in a liquid ejecting apparatus in which a wide variety of liquids are used, the corrosion resistance of the first connector and the second connector is improved by configuring at least one of the first insulator portion and the second insulator portion to contain glass fiber, and as a result, the reliability of the first connector and the second connector is improved, and the reliability of the signal propagated through the first connector and the second connector is improved.

In the liquid ejecting apparatus according to the aspect, no adhesive may be used in the first insulator portion and the second insulator portion.

According to this liquid ejecting apparatus, since the first insulator portion and the second insulator portion do not contain an adhesive, even in a liquid ejecting apparatus in which a wide variety of liquids are used, the possibility that the liquid reacts with the adhesive and the corrosion resistance of the first insulator portion and the second insulator portion is reduced is reduced. Therefore, the reliability of the first connector and the second connector is improved, and the reliability of the signal propagated through the first connector and the second connector is improved.

In the liquid ejecting apparatus according to the aspect, a solvent of the liquid may contain 1-methyl-2-pyrrolidone.

According to this liquid ejecting apparatus, even when 1-methyl-2-pyrrolidone, which has extremely high solubility, is used as a solvent in a liquid ejecting apparatus in which a wide variety of liquids are used to realize the wide variety of liquids, since the corrosion resistance of the first fixing portion and the second fixing portion is improved, the reliability of the first connector and the second connector is improved, and the reliability of the signal propagated through the first connector and the second connector is improved.

What is claimed is:

1. A liquid ejecting apparatus comprising:

a head unit that includes a piezoelectric element that is driven with supply of a drive signal and ejects a liquid by driving the piezoelectric element; and a drive signal output unit that outputs the drive signal, wherein the head unit includes:

an ejection portion configured to eject a wide variety of inks, a first rigid substrate that propagates the drive signal to the ejection portion, and a first connector to which the drive signal is input, wherein the drive signal output unit includes:

a second rigid substrate, and a second connector from which the drive signal is output, wherein the first connector includes:

a first fixing portion fixed to the first rigid substrate, a first insulator portion and a second insulator portion, the first insulator portion defining a protrusion and the second insulator portion surrounding the first insulator portion, a first terminal through which the drive signal propagates, arranged on one surface of the protrusion, a second terminal arranged on another surface of the protrusion, and each of the first terminal and the second terminal are sandwiched between the first insulator portion and the second insulator portion, and each of the first terminal and the second terminal include a section that extends in parallel with the first rigid substrate and are sandwiched between the second insulator portion and the first fixing portion, wherein the second connector includes:

a second fixing portion fixed to the second rigid substrate, a third insulator portion formed with an insertion hole into which the protrusion of the first insulator portion is inserted, a third terminal, through which the drive signal propagates, arranged on one surface of the insertion hole, and a fourth terminal arranged on another surface of the insertion hole, wherein the first connector and the second connector are fitted so that the first terminal and the third terminal are in direct contact with each other, and the second terminal and the fourth terminal are in direct contact with each other, and wherein at least one of the first fixing portion and the second fixing portion is tin-plated.

2. The liquid ejecting apparatus according to claim 1, wherein at least one of the first fixing portion and the second fixing portion contains a tin-plated copper alloy.

3. The liquid ejecting apparatus according to claim 1, wherein at least one of the first and second terminals arranged on the protrusion contains a copper alloy, or at least one of the third and fourth terminals arranged on the insertion hole contains a copper alloy.

4. The liquid ejecting apparatus according to claim 3, wherein at least one of the first and second terminals arranged on the protrusion is gold-plated, or at least one of the third and fourth terminals arranged on the insertion hole is gold-plated.

5. The liquid ejecting apparatus according to claim 1, wherein at least one of the first connector and the second connector is a floating connector.

6. The liquid ejecting apparatus according to claim 1, wherein at least one of the first insulator portion and the second insulator portion contains glass fiber.

7. The liquid ejecting apparatus according to claim 1, wherein no adhesive is used in the first insulator portion and the second insulator portion.

8. The liquid ejecting apparatus according to claim 1, wherein a solvent of the liquid contains 1-methyl-2-pyrrolidone.

* * * * *